United States Patent
Li et al.

(10) Patent No.: US 11,448,751 B2
(45) Date of Patent: Sep. 20, 2022

(54) OPTIMIZED TRANSMISSION FOR SINGLE/DOUBLE-SIDED TWO-WAY RANGING AMONG MANY DEVICES

(71) Applicant: Samsung Electronics Co., Ltd., Suwon-si (KR)

(72) Inventors: Zheda Li, Plano, TX (US); Aditya V. Padaki, Richardson, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 39 days.

(21) Appl. No.: 16/698,695

(22) Filed: Nov. 27, 2019

(65) Prior Publication Data

US 2020/0183000 A1    Jun. 11, 2020

Related U.S. Application Data

(60) Provisional application No. 62/775,827, filed on Dec. 5, 2018, provisional application No. 62/783,813, filed
(Continued)

(51) Int. Cl.
*H04W 4/00* (2018.01)
*G01S 13/87* (2006.01)
(Continued)

(52) U.S. Cl.
CPC .......... *G01S 13/878* (2013.01); *G01S 13/765* (2013.01); *H04L 43/106* (2013.01); *H04W 4/023* (2013.01);
(Continued)

(58) Field of Classification Search
CPC .... G01S 13/878; G01S 13/765; G01S 5/0252; G01S 5/02; G01S 5/14; H04L 29/08657;
(Continued)

(56) References Cited

U.S. PATENT DOCUMENTS

| | | | | |
|---|---|---|---|---|
| 2009/0264137 | A1* | 10/2009 | Soliman | G01S 5/0072 455/456.1 |
| 2015/0215821 | A1* | 7/2015 | Zhang | H04W 56/00 370/252 |

(Continued)

OTHER PUBLICATIONS

"IEEE Standard for Wireless Medium Access Control (MAC) and Physical Layer (PHY) Specifications for Peer Aware Communications (PAC)", IEEE Computer Society, IEEE Std 802.15.8TM, 2017, 322 pages.
(Continued)

*Primary Examiner* — Temica M Beamer

(57) ABSTRACT

A method of a transmit apparatus in a wireless communication system supporting ranging capability is provided. The method comprises: for a single-sided two-way ranging (SS-TWR), identifying a ranging round (RR) including a ranging initiation phase (RIP) for a set of transmit apparatuses including the transmit apparatus and a ranging response phase (RRP) for a set of receive apparatuses, wherein the RIP and the RRP comprise at least one slot; transmitting, to the set of receive apparatuses, a ranging initiation message in the RIP; and receiving, from one or more of the set of receive apparatuses, a ranging response message including information requested by the transmit apparatus in the RRP.

20 Claims, 30 Drawing Sheets

Related U.S. Application Data on Dec. 21, 2018, provisional application No. 62/803,853, filed on Feb. 11, 2019, provisional application No. 62/822,398, filed on Mar. 22, 2019, provisional application No. 62/867,660, filed on Jun. 27, 2019.

(51) Int. Cl.
| | |
|---|---|
| *G01S 13/76* | (2006.01) |
| *H04L 43/106* | (2022.01) |
| *H04W 84/18* | (2009.01) |
| *H04W 48/16* | (2009.01) |
| *H04W 64/00* | (2009.01) |
| *H04W 4/02* | (2018.01) |

(52) U.S. Cl.
CPC ........... *H04W 48/16* (2013.01); *H04W 64/00* (2013.01); *H04W 84/18* (2013.01)

(58) Field of Classification Search
CPC ........ H04L 43/06; H04W 4/023; H04W 4/02; H04W 84/18; H04W 48/16; H04W 64/00
USPC ................. 370/328; 455/456.1, 456.5, 456.6
See application file for complete search history.

(56) References Cited

U.S. PATENT DOCUMENTS

| | | | |
|---|---|---|---|
| 2016/0014805 A1 | 1/2016 | Merlin et al. | |
| 2019/0013937 A1* | 1/2019 | Leong | H04W 12/10 |
| 2020/0062217 A1* | 2/2020 | Ledvina | B60R 25/246 |
| 2020/0183000 A1* | 6/2020 | Li | H04L 43/106 |

OTHER PUBLICATIONS

"IEEE Standard for Low-Rate Wireless Networks", IEEE Computer Society, IEEE Std 802.15.4TM, 2015, 708 pages.
Extended European Search Report dated May 11, 2022 regarding Application No. 19893848.2, 13 pages.
Verso, "Ranging procedures and messages", IEEE P802.15 Working Group for Wireless Personal Area Networks (WPANs), IEEE P802.15-18-xxxx-00-004z, Nov. 2018, 24 pages.
Naguib et al., "MAC for Secure Ranging", IEEE P802.15 Working Group for Wireless Personal Area Networks (WPANs), 15-18-0540-00-004z, Nov. 2018, 14 pages.

* cited by examiner

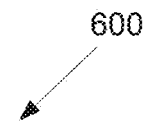 600
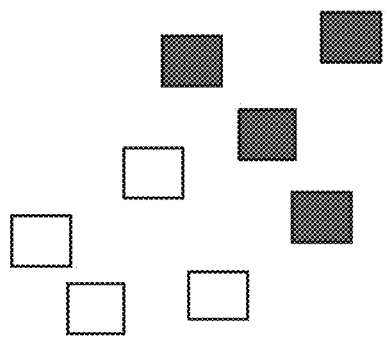
FIG. 6

| Bit: 0 | 1 | 2 | 3 | 4 | 5-6 | 7 | Octets: 0/1 | 0/Variable |
|---|---|---|---|---|---|---|---|---|
| Reply Time Request | Round-trip Measurement Request | TOF request | AOA Azimuth Request | AOA Elevation Request | Ranging Control Information | Reserved | RRMC Table Length | RRMC Table |

| Octets: 0/2/8 |
|---|
| Address |

| Bits: 0 | 1 | 2 | 3 | 4 | 5 | 6 | 7 | Octets: 1 | Variable |
|---|---|---|---|---|---|---|---|---|---|
| Address Present | Reply Time Present | Round-trip Time Present | TOF Present | AOA Azimuth Present | AOA Elevation Present | Deferred Mode | Reserved | RMI Table Length | RMI Table |

| Octets: 0/4 | 0/4 | 0/4 | 0/2 | 0/2 | 0/2/8 |
|---|---|---|---|---|---|
| RX-to-Tx Reply Time | TX-to-RX Round-trip Time | TOF | AOA Azimuth | AOA Elevation | Address |

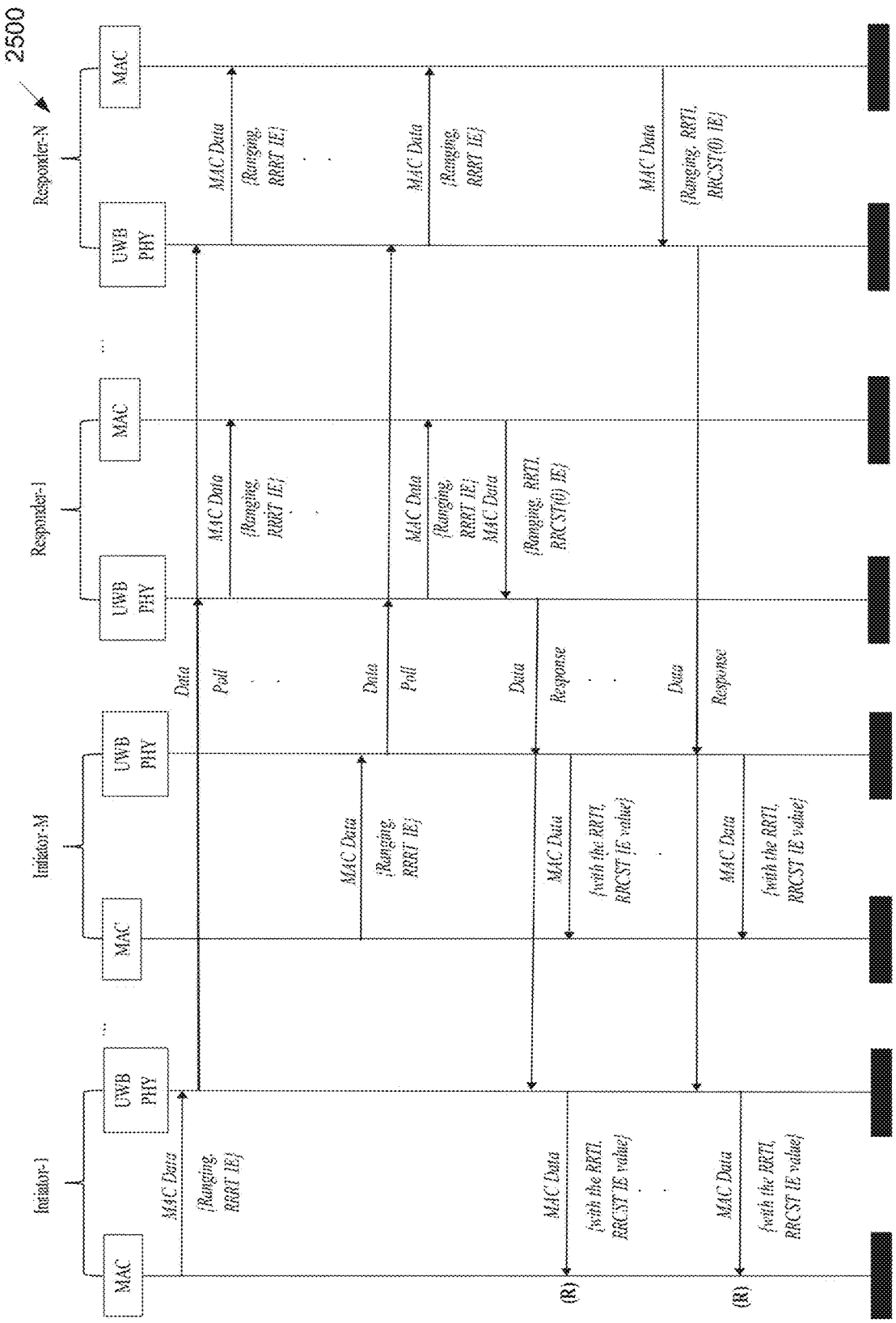

| Bit: 0 | 1~2 | 3~7 | Octets: 1 | Octets: 1 |
|---|---|---|---|---|
| 0: PP<br>1: RRP | STS Mode | Reserved | Time-slot index to start | Time-slot index to end |

FIG. 37

| Bit: 0 | 1 | 2~7 | Octets: 1 | Octets: 1 |
|---|---|---|---|---|
| 0: PP<br>1: RRP | STS Mode | Reserved | Time-slot index to start | Time-slot index to end |

FIG. 38

| Bits: 2 | 7 | 7 |
|---|---|---|
| Phase Indicator | Time-slot index to start | Time-slot index to end |

FIG. 39

OPTIMIZED TRANSMISSION FOR SINGLE/DOUBLE-SIDED TWO-WAY RANGING AMONG MANY DEVICES

CROSS-REFERENCE TO RELATED APPLICATIONS AND CLAIM OF PRIORITY

The present application claims priority to:
U.S. Provisional Patent Application Ser. No. 62/775,827 filed on Dec. 5, 2018;
U.S. Provisional Patent Application Ser. No. 62/783,813 filed on Dec. 21, 2018;
U.S. Provisional Patent Application Ser. No. 62/803,853 filed on Feb. 11, 2019;
U.S. Provisional Patent Application Ser. No. 62/822,398 filed on Mar. 22, 2019; and
U.S. Provisional Patent Application Ser. No. 62/867,660 filed on Jun. 27, 2019. The content of the above-identified patent documents is incorporated herein by reference.

TECHNICAL FIELD

The present disclosure relates generally to ranging operation in a wireless communication system. In particular, a single/double-sided two-way ranging between many devices and many devices is presented.

BACKGROUND

A peer aware communication (PAC) network is a fully distributed communication network that allows direct communication among the PAC devices (PDs). PAC networks may employ several topologies like mesh, star, etc. to support interactions among the PDs for various services.

SUMMARY

Embodiments of the present disclosure provide methods and apparatuses got a single/double-sided two-way ranging between many devices and many devices in wireless communication systems.

In one embodiment, a transmit apparatus in a wireless communication system supporting ranging capability is provided. The transmit apparatus comprises a processor configured to, for a single-sided two-way ranging (SS-TWR), identify a ranging round (RR) including a ranging initiation phase (RIP) for a set of transmit apparatuses including the transmit apparatus and a ranging response phase (RRP) for a set of receive apparatuses, wherein the RIP and the RRP comprise at least one slot. The transmit apparatus further comprises a transceiver operably connected to the processor, the transceiver configured to: transmit, to the set of receive apparatuses, a ranging initiation message in the RIP; and receive, from one or more of the set of receive apparatuses, a ranging response message including information requested by the transmit apparatus in the RRP.

In another embodiment, a receive apparatus in a wireless communication system supporting ranging capability is provided. The receive apparatus comprises a transceiver configured to receive, from a transmit apparatus of a set of transmit apparatuses, a ranging initiation message in a ranging initiation phase (RIP). The receive apparatus further comprises a processor operably connected to the transceiver, the processor configured to, for a single-sided two-way ranging (SS-TWR), identify a ranging round (RR) including the RIP for a set of receive apparatuses including the receive apparatus to receive and a ranging response phase (RRP) for the set of transmit apparatuses to receive, the RIP and the RRP comprising at least one slot, wherein, the transceiver is further configured to transmit, to one or more of the set of transmit apparatuses, a ranging response message including information requested by the transmit apparatus in the RRP.

In yet another embodiment, a method of a transmit apparatus in a wireless communication system supporting ranging capability is provided. The method comprises, for a single-sided two-way ranging (SS-TWR), identifying a ranging round (RR) including a ranging initiation phase (RIP) for a set of transmit apparatuses including the transmit apparatus and a ranging response phase (RRP) for a set of receive apparatuses, wherein the RIP and the RRP comprise at least one slot; transmitting, to the set of receive apparatuses, a ranging initiation message in the RIP; and receiving, from one or more of the set of receive apparatuses, a ranging response message including information requested by the transmit apparatus in the RRP.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates an example many-to-many scenario according to embodiments of the present disclosure;

FIG. 20 illustrates an example ranging request measurement and control IE content field format according to embodiments of the present disclosure;

FIG. 21 illustrates an example RRMC table row element format according to embodiments of the present disclosure;

FIG. 22 illustrates an example ranging measurement information IE content field format according to embodiments of the present disclosure;

FIG. 23 illustrates an example RMI table row element format according to embodiments of the present disclosure;

FIG. 25 illustrates an example message sequence chart for scheduling-based M2M SS-TWR with optimized transmission according to embodiments of the present disclosure;

FIG. 37 illustrates an example row in CP table with STS mode according to embodiments of the present disclosure;

FIG. 38 illustrates another example row in CP table with STS mode according to embodiments of the present disclosure;

FIG. 39 illustrates an example row element in the CP table according to embodiments of the present disclosure;

DETAILED DESCRIPTION

FIG. 1 through FIG. 42, discussed below, and the various embodiments used to describe the principles of the present disclosure in this patent document are by way of illustration only and should not be construed in any way to limit the scope of the disclosure. Those skilled in the art may understand that the principles of the present disclosure may be implemented in any suitably arranged system or device.

The following documents and standards descriptions are hereby incorporated by reference into the present disclosure as if fully set forth herein: IEEE Standard for Wireless Medium Access Control (MAC) and Physical Layer (PHY) Specifications for Peer Aware Communications, IEEE Std 802.15.8, 2017; and IEEE Standard Wireless Medium Access Control (MAC) and Physical Layer (PHY) Specifications for Low Rate Wireless Personal Area Networks (WPANs), IEEE Std 802.15.4, 2105.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

Figure 1:
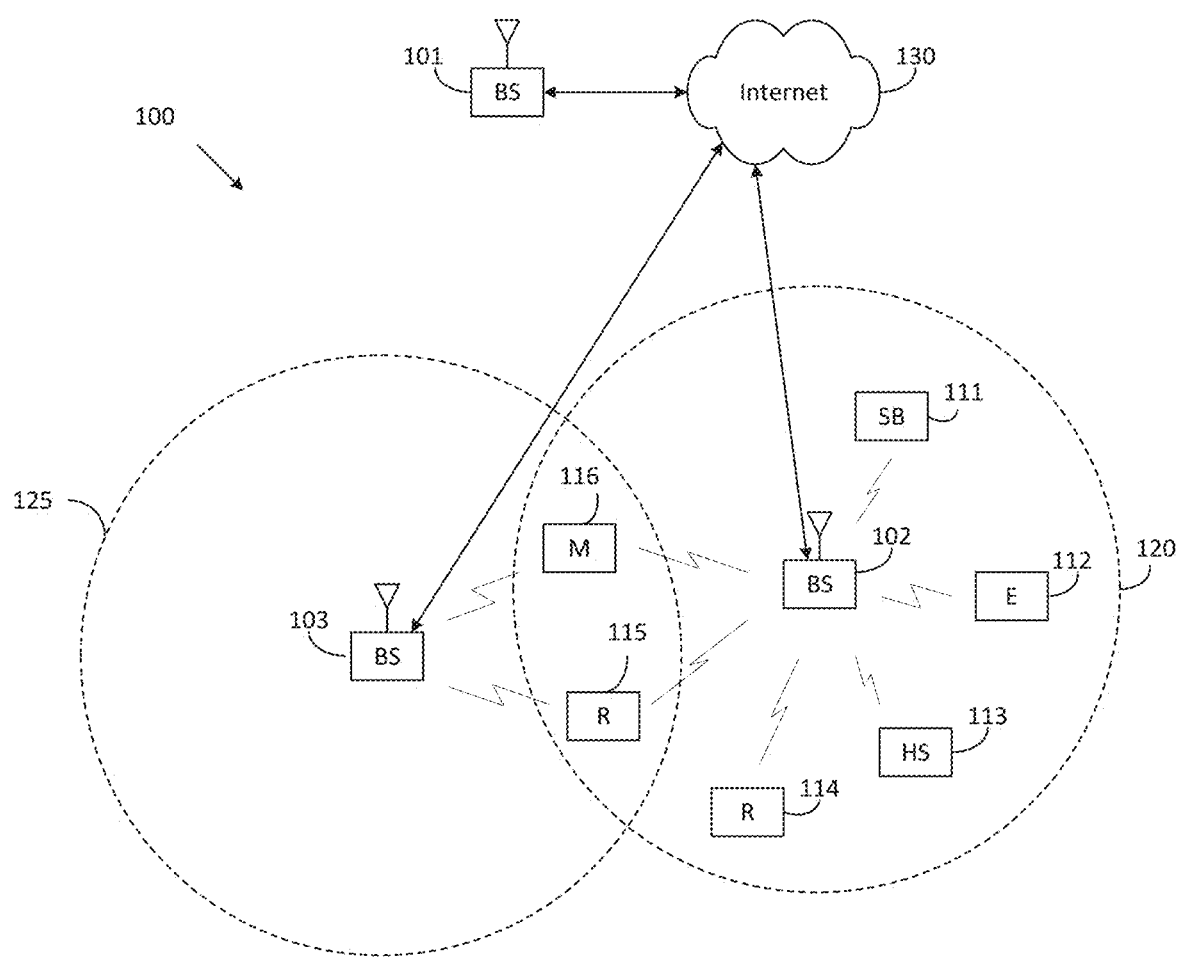
FIG. 1 illustrates an example wireless network according to embodiments of the present disclosure.
Figure 2:
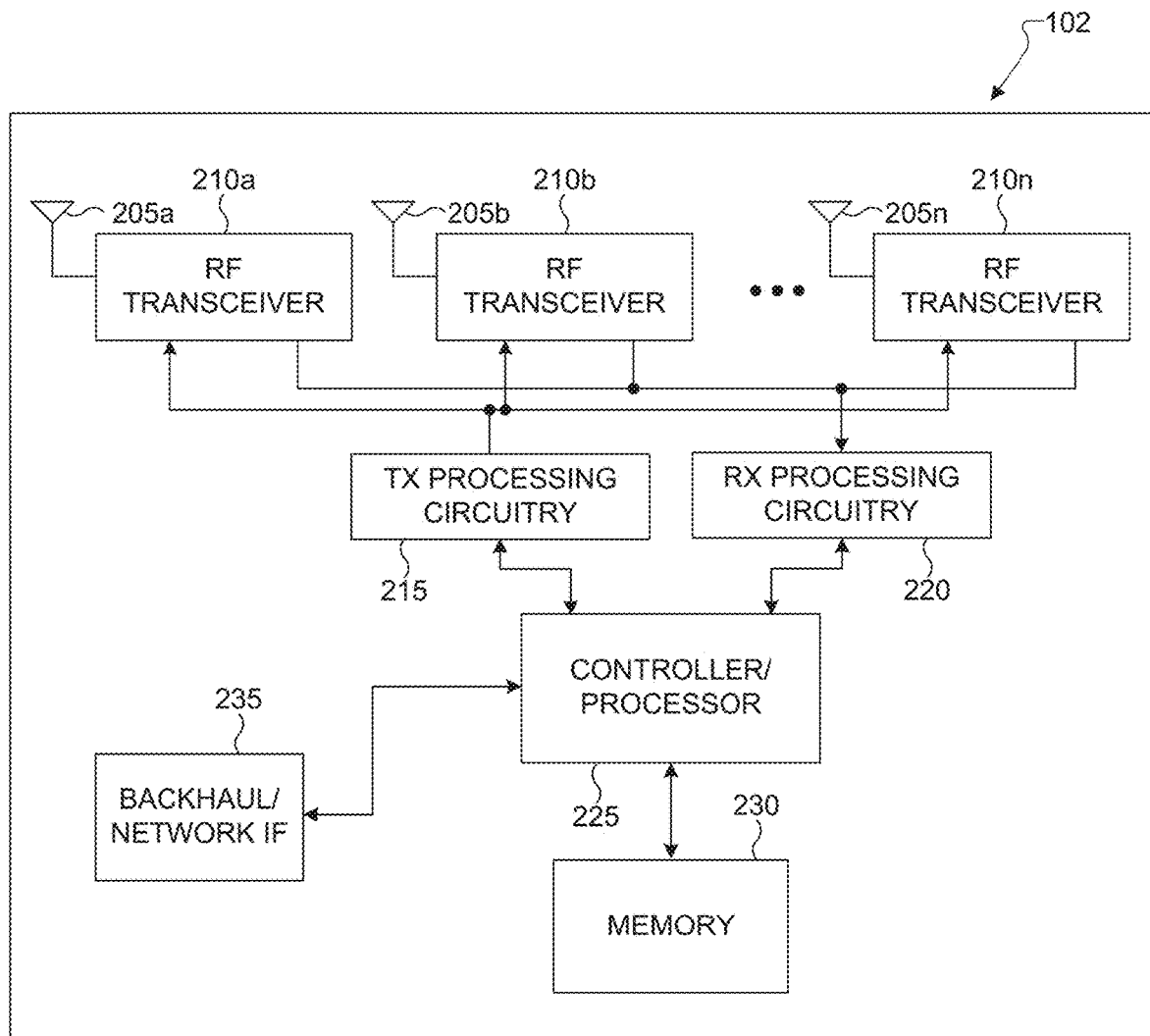
FIG. 2 illustrates an example gNB according to embodiments of the present disclosure.
Figure 3:
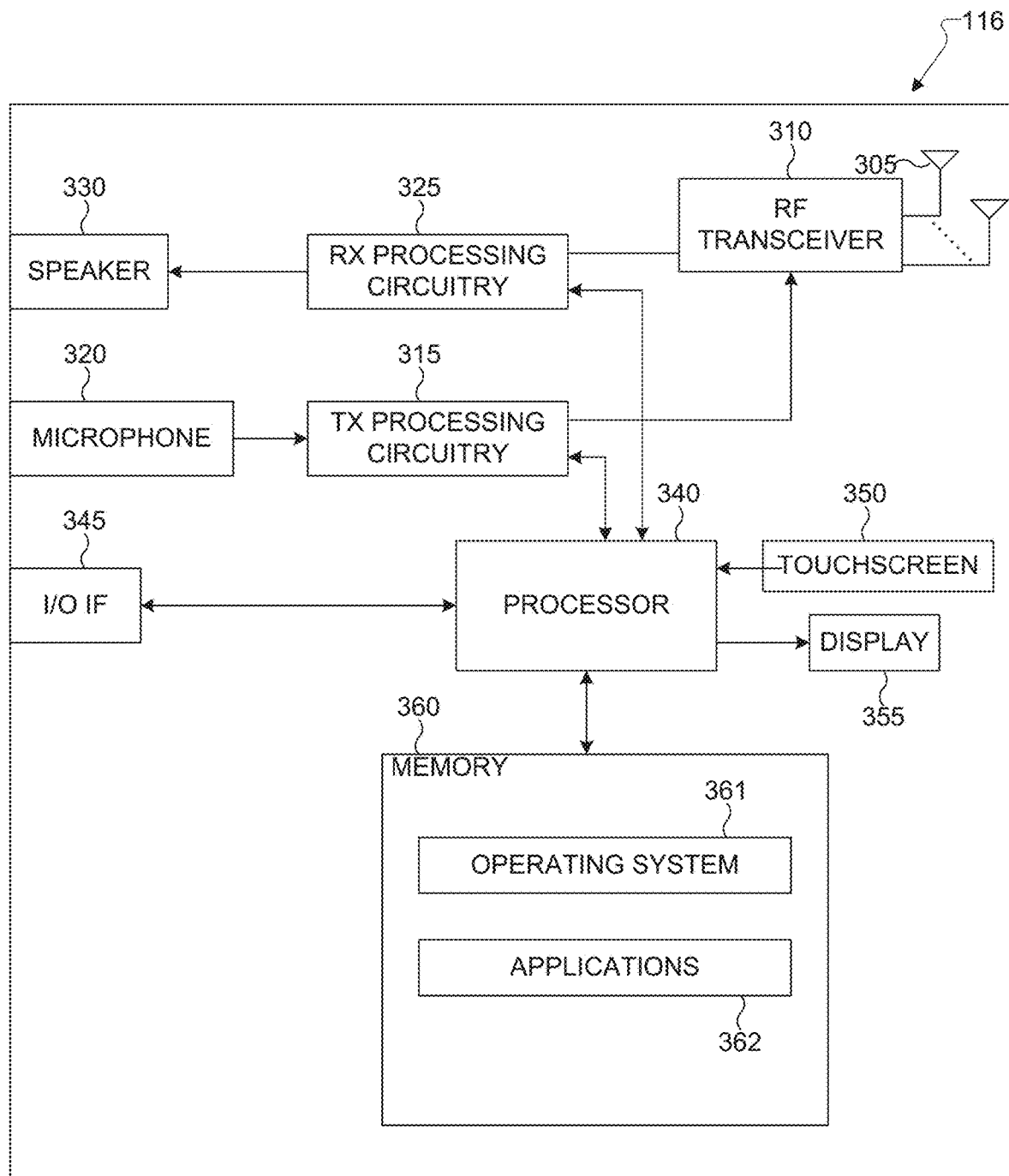
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101 (e.g., base station (BS)), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for CSI reporting in an advanced wireless communication system. In certain embodiments, and one or more of the gNBs 101-103 includes circuitry, programing, or a combination thereof, for CSI acquisition in an advanced wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
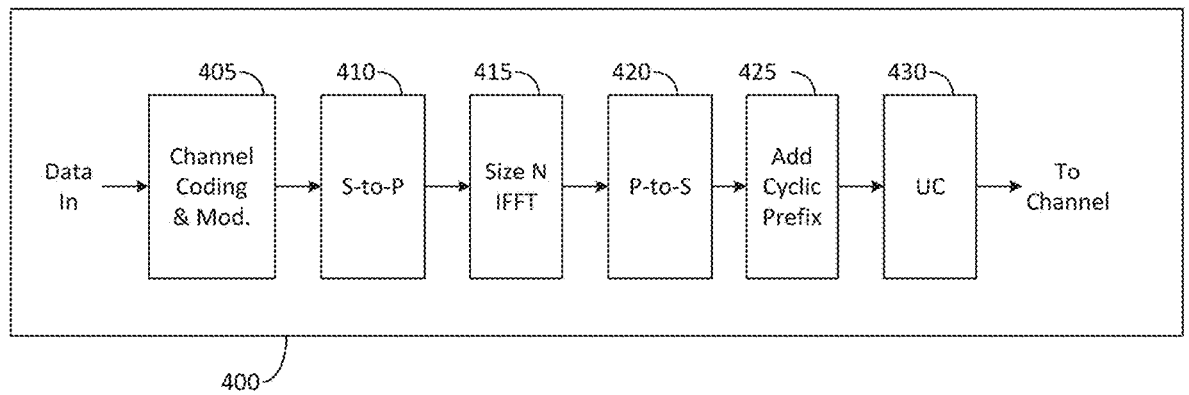
FIG. 4A illustrates a high-level diagram of an orthogonal frequency division multiple access transmit path according to embodiments of the present disclosure.
Figure 4B:
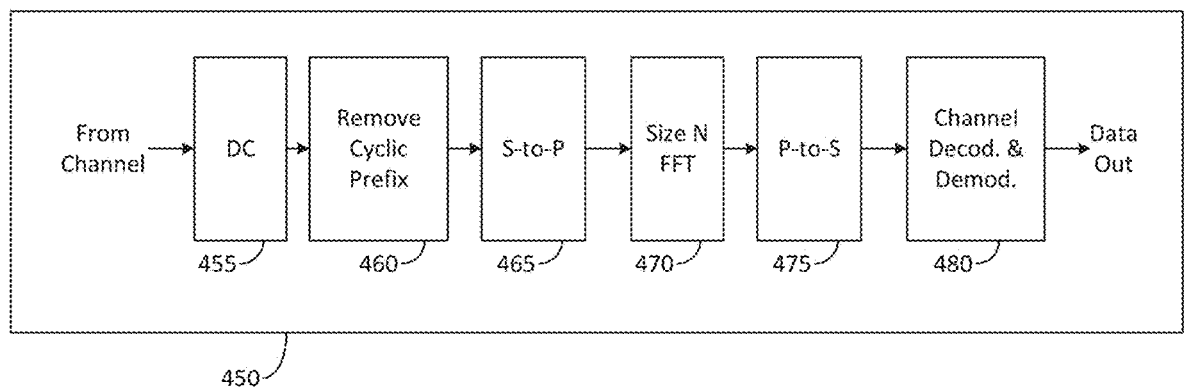
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in the present disclosure document may be implemented as configurable software algorithms, where the value of Size N may be modified according to the implementation.

Furthermore, although the present disclosure is directed to an embodiment that implements the Fast Fourier Transform and the Inverse Fast Fourier Transform, this is by way of illustration only and may not be construed to limit the scope of the present disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at the gNB 102 are performed. Down-converter 455 down-converts the received signal to baseband frequency and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

A peer aware communication (PAC) network is a fully distributed communication network that allows direct communication among the PAC devices (PDs). PAC networks may employ several topologies like mesh, star, etc. to support interactions among the PDs for various services. While the present disclosure uses PAC networks and PDs as an example to develop and illustrate the present disclosure, it is to be noted that the present disclosure is not confined to these networks. The general concepts developed in the present disclosure may be employed in various type of networks with different kind of scenarios.

Figure 5:
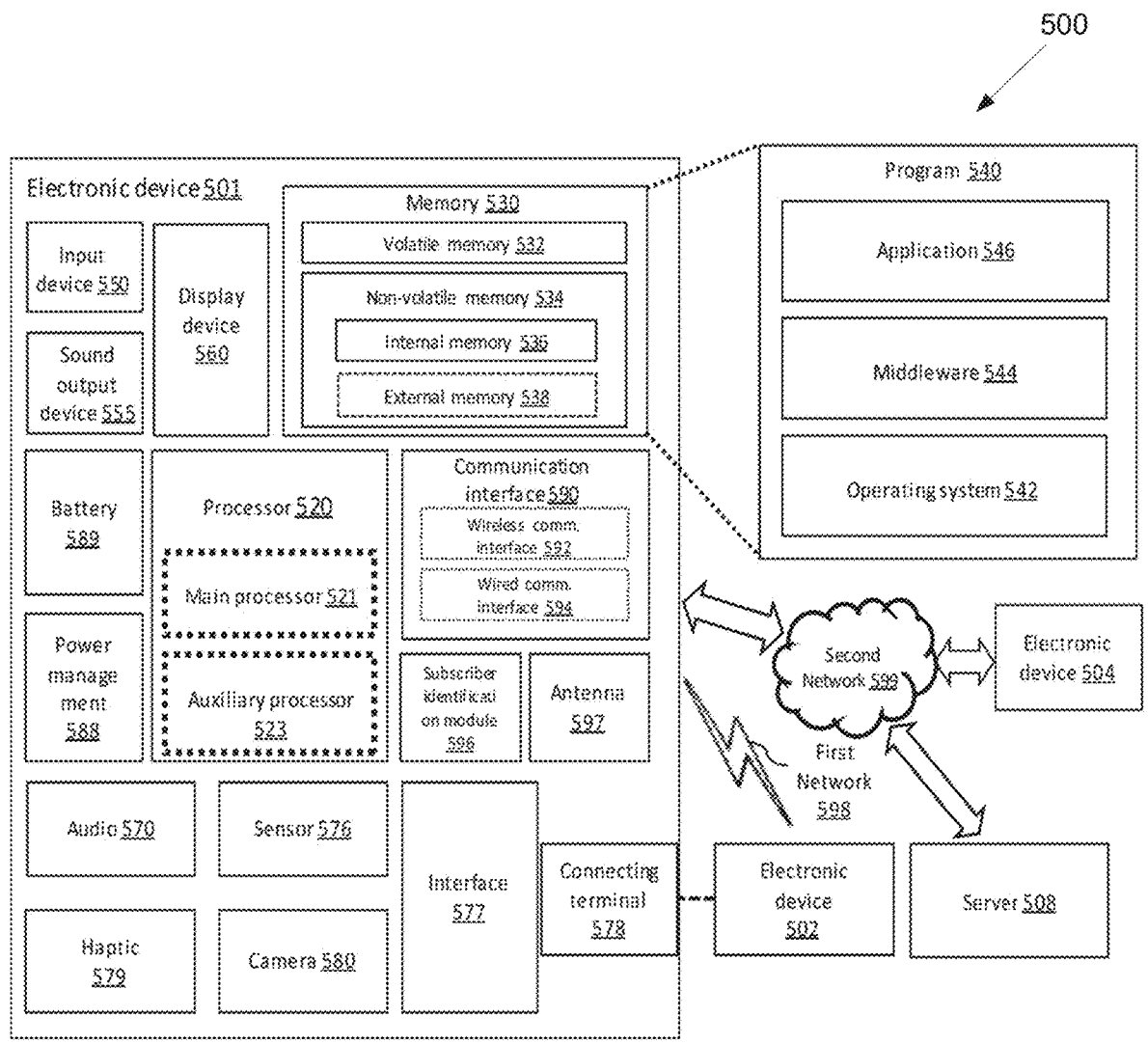
FIG. 5 illustrates an example electronic device according to embodiments of the present disclosure.

FIG. 5 illustrates an example electronic device 500 according to embodiments of the present disclosure. The embodiment of the electronic device 500 illustrated in FIG. 5 is for illustration only. FIG. 5 does not limit the scope of the present disclosure to any particular implementation.

PDs can be an electronic device. FIG. 5 illustrates an example electronic device 501 in a network environment 500 according to various embodiments. Referring to FIG. 5, the electronic device 501 in the network environment 500 may communicate with an electronic device 502 via a first network 598 (e.g., a short-range wireless communication network), or an electronic device 104 or a server 508 via a second network 599 (e.g., a long-range wireless communication network). According to an embodiment, the electronic device 501 may communicate with the electronic device 504 via the server 508.

According to an embodiment, the electronic device 501 may include a processor 520, memory 530, an input device 550, a sound output device 555, a display device 560, an audio 570, a sensor 576, an interface 577, a haptic 579, a camera 580, a power management 588, a battery 589, a communication interface 590, a subscriber identification module (SIM) 596, or an antenna 597. In some embodiments, at least one (e.g., the display device 560 or the camera 580) of the components may be omitted from the electronic device 501, or one or more other components may be added in the electronic device 501. In some embodiments, some of the components may be implemented as single integrated circuitry. For example, the sensor 576 (e.g., a fingerprint sensor, an iris sensor, or an illuminance sensor) may be implemented as embedded in the display device 560 (e.g., a display).

The processor 520 may execute, for example, software (e.g., a program 540) to control at least one other component (e.g., a hardware or software component) of the electronic device 501 coupled with the processor 520 and may perform various data processing or computation. According to one embodiment of the present disclosure, as at least part of the data processing or computation, the processor 520 may load a command or data received from another component (e.g., the sensor 576 or the communication interface 590) in volatile memory 532, process the command or the data stored in the volatile memory 532, and store resulting data in non-volatile memory 534.

According to an embodiment of the present disclosure, the processor 520 may include a main processor 521 (e.g., a central processing unit (CPU) or an application processor (AP)), and an auxiliary processor 523 (e.g., a graphics processing unit (GPU), an image signal processor (ISP), a sensor hub processor, or a communication processor (CP)) that is operable independently from, or in conjunction with, the main processor 521. Additionally, or alternatively, the auxiliary processor 523 may be adapted to consume less power than the main processor 521, or to be specific to a specified function. The auxiliary processor 523 may be implemented as separate from, or as part of the main processor 521.

The auxiliary processor 523 may control at least some of functions or states related to at least one component (e.g., the display device 560, the sensor 576, or the communication interface 590) among the components of the electronic device 501, instead of the main processor 521 while the main processor 521 is in an inactive (e.g., sleep) state, or together with the main processor 521 while the main processor 521 is in an active state (e.g., executing an application). According to an embodiment, the auxiliary processor 523 (e.g., an image signal processor or a communication processor) may be implemented as part of another component (e.g., the camera 580 or the communication interface 190) functionally related to the auxiliary processor 523.

The memory 530 may store various data used by at least one component (e.g., the processor 520 or the sensor 576) of the electronic device 501. The various data may include, for example, software (e.g., the program 540) and input data or output data for a command related thereto. The memory 530 may include the volatile memory 532 or the non-volatile memory 534.

The program 50 may be stored in the memory 530 as software, and may include, for example, an operating system (OS) 542, middleware 544, or an application 546.

The input device 550 may receive a command or data to be used by another component (e.g., the processor 520) of the electronic device 101, from the outside (e.g., a user) of the electronic device 501. The input device 550 may include, for example, a microphone, a mouse, a keyboard, or a digital pen (e.g., a stylus pen).

The sound output device 555 may output sound signals to the outside of the electronic device 501. The sound output device 555 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 560 may visually provide information to the outside (e.g., a user) of the electronic device 501. The display device 560 may include, for example, a display, a hologram device, or a projector and control circuitry to control a corresponding one of the displays, hologram device, and projector. According to an embodiment, the display device 560 may include touch circuitry adapted to detect a touch, or sensor circuitry (e.g., a pressure sensor) adapted to measure the intensity of force incurred by the touch.

The audio 570 may convert a sound into an electrical signal and vice versa. According to an embodiment, the audio 570 may obtain the sound via the input device 550, or output the sound via the sound output device 555 or a headphone of an external electronic device (e.g., an electronic device 502) directly (e.g., using wired line) or wirelessly coupled with the electronic device 501.

The sensor 576 may detect an operational state (e.g., power or temperature) of the electronic device #01 or an environmental state (e.g., a state of a user) external to the electronic device 501, and then generate an electrical signal or data value corresponding to the detected state. According to an embodiment, the sensor 576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 577 may support one or more specified protocols to be used for the electronic device 501 to be coupled with the external electronic device (e.g., the electronic device 502) directly (e.g., using wired line) or wirelessly. According to an embodiment of the present disclosure, the interface 577 may include, for example, a high definition multimedia interface (HDMI), a universal serial bus (USB) interface, a secure digital (SD) card interface, or an audio interface.

A connecting terminal 578 may include a connector via which the electronic device 501 may be physically connected with the external electronic device (e.g., the electronic device 502). According to an embodiment, the connecting terminal 578 may include, for example, a HDMI connector, a USB connector, a SD card connector, or an audio connector (e.g., a headphone connector).

The haptic 579 may convert an electrical signal into a mechanical stimulus (e.g., a vibration or a movement) or electrical stimulus which may be recognized by a user via his tactile sensation or kinesthetic sensation. According to an embodiment, the haptic 579 may include, for example, a motor, a piezoelectric element, or an electric stimulator.

The camera 580 may capture a still image or moving images. According to an embodiment of the present disclosure, the camera 580 may include one or more lenses, image sensors, image signal processors, or flashes.

The power management 588 may manage power supplied to the electronic device 501. According to one embodiment, the power management 588 may be implemented as at least part of, for example, a power management integrated circuit (PMIC). The battery 589 may supply power to at least one component of the electronic device 501. According to an embodiment, the battery 589 may include, for example, a primary cell which is not rechargeable, a secondary cell which is rechargeable, or a fuel cell.

The communication interface 590 may support establishing a direct (e.g., wired) communication channel or a wireless communication channel between the electronic device 101 and the external electronic device (e.g., the electronic device 502, the electronic device 504, or the server 508) and performing communication via the established communication channel. The communication interface 590 may include one or more communication processors that are operable independently from the processor 520 (e.g., the application processor (AP)) and supports a direct (e.g., wired) communication or a wireless communication.

According to an embodiment of the present disclosure, the communication interface 590 may include a wireless communication interface 592 (e.g., a cellular communication interface, a short-range wireless communication interface, or a global navigation satellite system (GNSS) communication interface) or a wired communication interface 594 (e.g., a local area network (LAN) communication interface or a power line communication (PLC)). A corresponding one of these communication interfaces may communicate with the external electronic device via the first network 598 (e.g., a short-range communication network, such as Bluetooth, wireless-fidelity (Wi-Fi) direct, ultra-wide band (UWB), or infrared data association (IrDA)) or the second network 599 (e.g., a long-range communication network, such as a cellular network, the Internet, or a computer network (e.g., LAN or wide area network (WAN)).

These various types of communication interfaces may be implemented as a single component (e.g., a single chip), or may be implemented as multi components (e.g., multi chips) separate from each other. The wireless communication interface 592 may identify and authenticate the electronic device 501 in a communication network, such as the first network 598 or the second network 599, using subscriber information (e.g., international mobile subscriber identity (IMSI)) stored in the subscriber identification module 596.

The antenna 597 may transmit or receive a signal or power to or from the outside (e.g., the external electronic device) of the electronic device 501. According to an embodiment, the antenna 597 may include an antenna including a radiating element composed of a conductive material or a conductive pattern formed in or on a substrate (e.g., PCB). According to an embodiment, the antenna 597 may include a plurality of antennas. In such a case, at least one antenna appropriate for a communication scheme used in the communication network, such as the first network 198 or the second network 599, may be selected, for example, by the communication interface 590 (e.g., the wireless communication interface 592) from the plurality of antennas. The signal or the power may then be transmitted or received between the communication interface 590 and the external electronic device via the selected at least one antenna. According to an embodiment, another component (e.g., a radio frequency integrated circuit (RFIC)) other than the radiating element may be additionally formed as part of the antenna 597.

At least some of the above-described components may be coupled mutually and communicate signals (e.g., commands or data) there between via an inter-peripheral communication scheme (e.g., a bus, general purpose input and output (GPIO), serial peripheral interface (SPI), or mobile industry processor interface (MIPI)).

According to an embodiment of the present disclosure, commands or data may be transmitted or received between the electronic device 501 and the external electronic device 504 via the server 508 coupled with the second network 599. Each of the electronic devices 502 and 504 may be a device of a same type as, or a different type, from the electronic device 501. According to an embodiment, all or some of operations to be executed at the electronic device 501 may be executed at one or more of the external electronic devices 502, 504, or 508. For example, if the electronic device 501 may perform a function or a service automatically, or in response to a request from a user or another device, the electronic device 501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 501. The electronic device 501 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the present disclosure, the electronic devices are not limited to those described above.

Various embodiments as set forth herein may be implemented as software (e.g., the program 140) including one or more instructions that are stored in a storage medium (e.g., internal memory 536 or external memory 538) that is readable by a machine (e.g., the electronic device 501). For example, a processor (e.g., the processor 520) of the machine (e.g., the electronic device 501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the present disclosure, a method according to various embodiments of the present disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the present disclosure, each component (e.g., a module or a program) of the above-described components may include a single entity or multiple entities. According to various embodiments, one or more of the above-described components may be omitted, or one or more other components may be added. Alternatively, or additionally, a plurality of components (e.g., modules or programs) may be integrated into a single component. In such a case, according to various embodiments, the integrated component may still perform one or more functions of each of the plurality of components in the same or similar manner as one or more functions are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Ultra-wideband communication, realized by sending a short radio pulse, brings some key benefits to wireless communications, including low-complexity transceiver design, large capacity by utilizing large bandwidth, and robustness to inter-symbol-interference (ISI) of multi-path environment. Meanwhile, the extremely narrow pulses also lower the probability of interception and detection by the third party, which is promising for the data service with highly secure requirement, e.g., secure ranging. Currently, IEEE 802.15.4z is exploring and developing enhancements for capabilities of low rate and high rate UWB impulse radio, aiming to provide better integrity and efficiency.

Ranging and relative localization are essential for various location-based services and applications, e.g., Wi-Fi direct, internet-of-things (IoTs), etc. With the tremendous increasing of network devices, high demands of ranging requests can be foreseen in the near future, which implies overall ranging message exchanges occur frequently in the network. This may worsen the bottleneck limited by the battery capacity. Energy efficiency becomes more critical for mobile devices, and self-sustained static devices, e.g., low-power sensors.

Another critical issue in the dense environment is the latency to fulfill all scheduled ranging sessions for different ranging pairs. Based on the ranging procedures as defined in IEEE specification, each ranging pair may be assigned with dedicated time slots. It may result in long latency for latter scheduled pairs if there exist large amounts of ranging requests.

Therefore, implementation of more efficient ranging protocols is necessary to reduce the number of required message exchanges for many ranging pairs. In the present disclosure, the optimized ranging procedure is provided between a group of devices and another group of devices. As illustrated in FIG. 6, one or more devices of group-1 has the ranging request to one or more devices of group-2 or vice versa. Exploiting the broadcast characteristics of wireless channel, mechanisms of optimized transmissions can be respectively realized based on the ranging operation, i.e., single-sided two-way ranging (SS-TWR) and double-sided two-way ranging (DS-TWR), which significantly reduce the number of required information exchange, compared with the current standard.

FIG. 6 illustrates an example many-to-many scenario 600 according to embodiments of the present disclosure. The embodiment of the many-to-many scenario 600 illustrated in FIG. 6 is for illustration only. FIG. 6 does not limit the scope of the present disclosure to any particular implementation.

As illustrated in FIG. 6, group-1 and group 2 determined with one or more devices. One or more devices from group-1 have ranging requests to one or more devices from group-2.

In the present disclosure, for a pair of devices to fulfill message exchange of ranging, the devices and associated messages is provided by following respective terms: initiator; device which initializes and sends the first ranging frame (RFRAME) to one or more responders; responder, device which expects to receive the first RFRAME from one or more initiators; poll, RFRAME sent by initiator, and ranging response. RFRAME is sent by responder.

Figure 7:
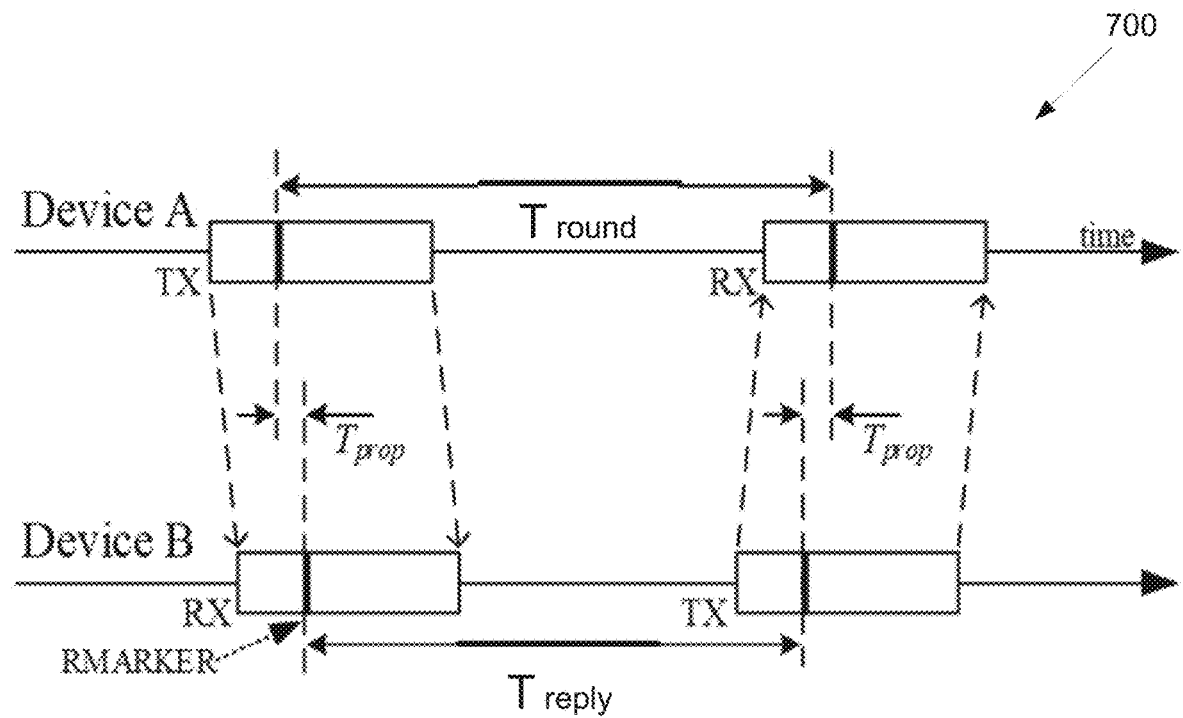
FIG. 7 illustrates an example single-sided two-way ranging according to embodiments of the present disclosure.

FIG. 7 illustrates an example single-sided two-way ranging 700 according to embodiments of the present disclosure. The embodiment of the single-sided two-way ranging 700 illustrated in FIG. 7 is for illustration only. FIG. 7 does not limit the scope of the present disclosure to any particular implementation.

SS-TWR involves a simple measurement of the roundtrip delay of a single message from the initiator to the responder and a response sent back to the initiator. The operation of SS-TWR is as shown in FIG. 7, where device A initiates the exchange and device B responds to complete the exchange. Each device precisely timestamps the transmission and reception times of the message frames, and so can calculate times $T_{round}$ and $T_{reply}$ by simple subtraction. Hence, the resultant time-of-flight, $T_{prop}$, can be estimated by the equation: $\hat{T}_{prop} = \frac{1}{2}(T_{round} - T_{reply})$.

Figure 8:
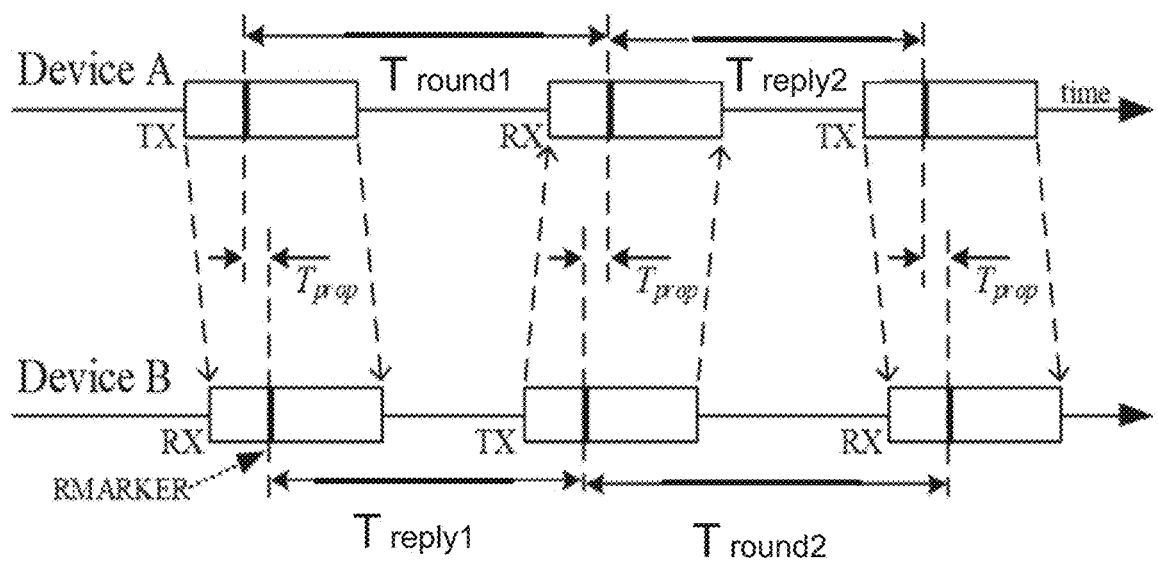
FIG. 8 illustrates an example double-sided two-way ranging with three messages according to embodiments of the present disclosure.

FIG. 8 illustrates an example double-sided two-way ranging with three messages 800 according to embodiments of the present disclosure. The embodiment of the double-sided two-way ranging with three messages 800 illustrated in FIG. 8 is for illustration only. FIG. 8 does not limit the scope of the present disclosure to any particular implementation.

DS-TWR with three messages is illustrated in FIG. 8, which reduces the estimation error induced by clock drift from long response delays. Device A is the initiator to initialize the first roundtrip measurement, while device B as the responder, responses to complete the first roundtrip measurement, and meanwhile initialize the second roundtrip measurement. Each device precisely timestamps the transmission and reception times of the messages, and the resultant time-of-flight estimate, $T_{prop}$, can be calculated by the expression:

$$\hat{T}_{prop} = \frac{(T_{round1} \times T_{round2} - T_{reply1} \times T_{reply2})}{(T_{round1} + T_{round2} + T_{reply1} + T_{reply2})}.$$

Figure 9:
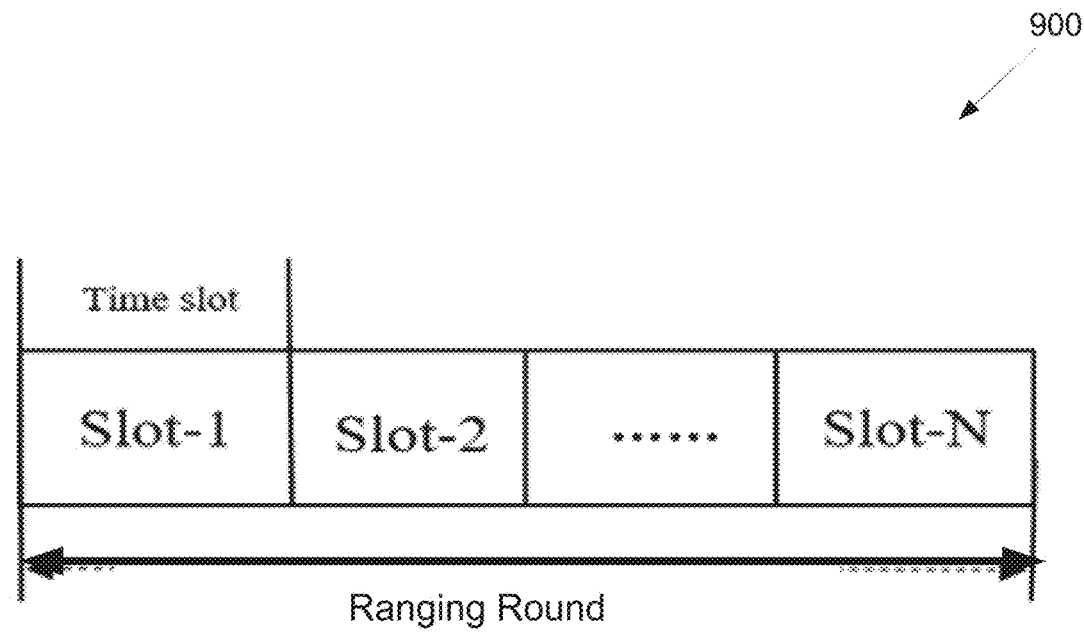
FIG. 9 illustrates an example time structure of ranging round according to embodiments of the present disclosure.

FIG. 9 illustrates an example time structure of ranging round 900 according to embodiments of the present disclosure. The embodiment of the time structure of ranging round 900 illustrated in FIG. 9 is for illustration only. FIG. 9 does not limit the scope of the present disclosure to any particular implementation.

A ranging configuration incorporates the control information of a ranging round, which consists of multiple time slots as FIG. 9. Time slot is the basic time unit to fulfill a message exchange. Other conventions to fulfill the same functionalities as ranging round and time slot are not precluded in the present disclosure. Depending on the device capabilities, slot duration and number of time slots in a ranging round can be adjusted in the ranging configuration, or slot duration and number of time slots are fixed to the default setting. One or multiple pair of devices can participate in a ranging round to fulfill the ranging requests.

Figure 10:
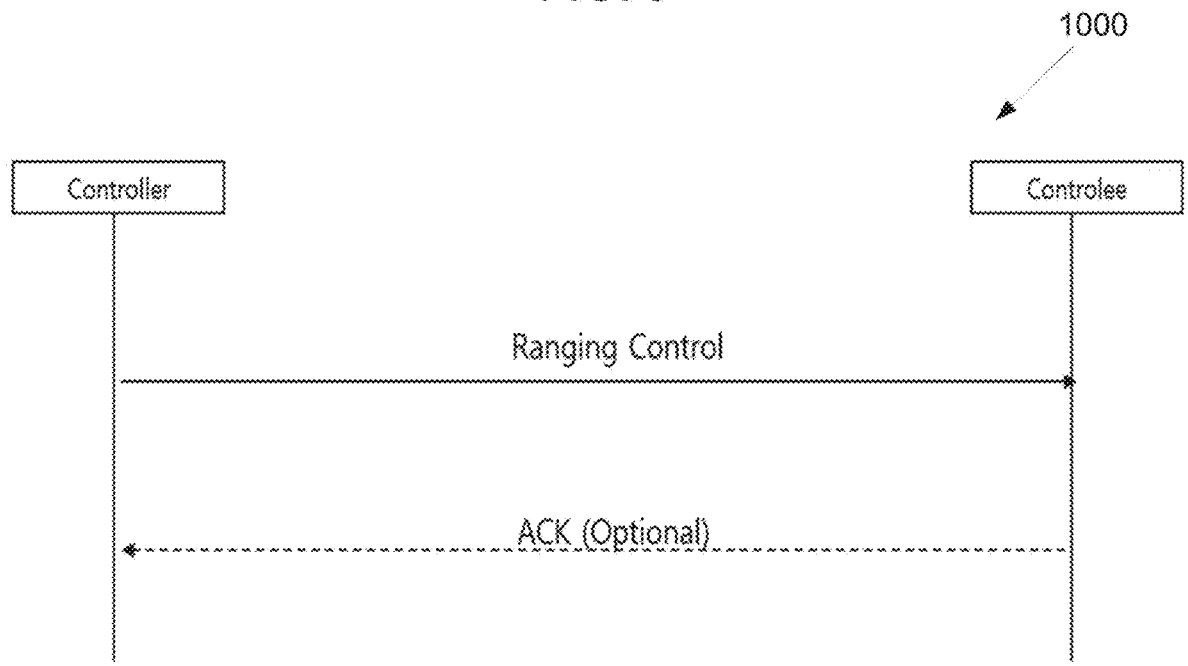
FIG. 10 illustrates an example ranging device nomenclatures with controller and controlee according to embodiments of the present disclosure.

FIG. 10 illustrates an example ranging device nomenclatures with controller and controlee 1000 according to embodiments of the present disclosure. The embodiment of the ranging device nomenclatures with controller and controlee 1000 illustrated in FIG. 10 is for illustration only. FIG. 10 does not limit the scope of the present disclosure to any particular implementation.

The setting of a ranging configuration determined by the next higher layer can be sent to one or more ranging controlees from a ranging controller (lead device) as shown in FIG. 10. With different network formations, the ranging configuration can be conveyed via a dedicated data frame sent to one or more devices, or the ranging configuration can be embedded into a sync frame broadcast to all devices in the network. Meanwhile, the present disclosure does not preclude other methods to exchange the ranging configuration information, e.g., via the higher layer or our-of-band management.

Figure 11:
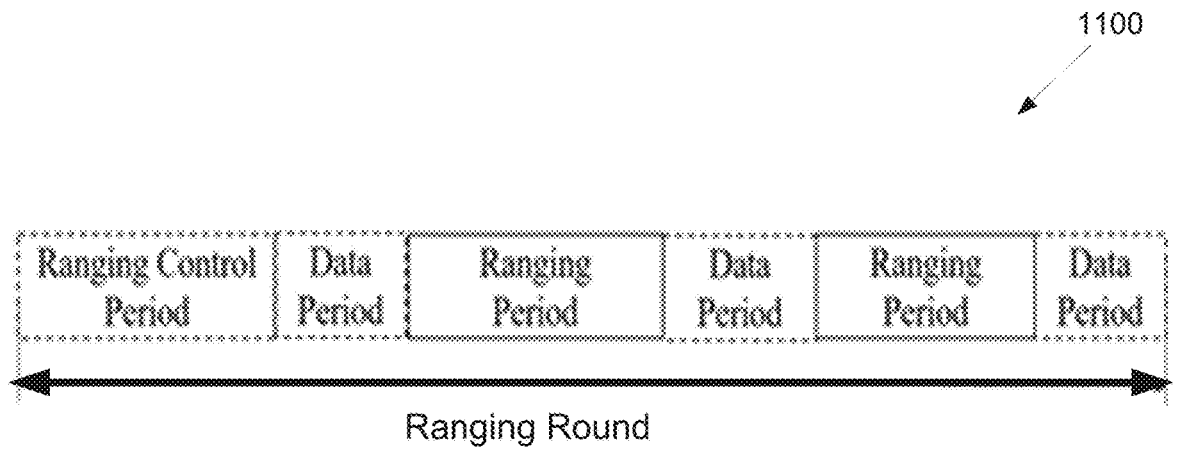
FIG. 11 illustrates an example general ranging round structure according to embodiments of the present disclosure.

FIG. 11 illustrates an example general ranging round structure 1100 according to embodiments of the present disclosure. The embodiment of the general ranging round structure 1100 illustrated in FIG. 11 is for illustration only. FIG. 11 does not limit the scope of the present disclosure to any particular implementation.

Ranging configuration includes the structure of a ranging round which contains one or more polling periods (PP) and one or more ranging response periods (RRP), where a PP consists of one or more time slots to send polling messages from initiator(s), and an RRP consists one or more time slots to send response messages from responder(s). A general ranging round structure can be found in FIG. 11, where one or more ranging periods may be used to transmit RFRAMEs, and one or more data periods can be used to exchange ranging results or other data frames.

Figure 12:
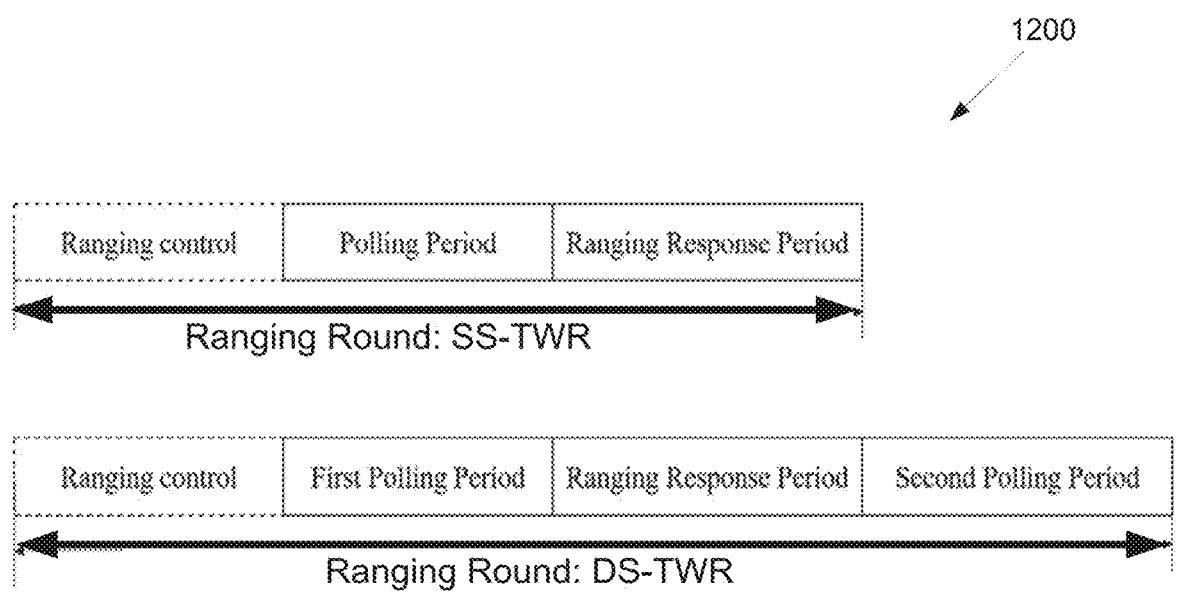
FIG. 12 illustrates an example ranging round structure according to embodiments of the present disclosure.

FIG. 12 illustrates an example ranging round structure 1200 according to embodiments of the present disclosure. The embodiment of the ranging round structure 1200 illustrated in FIG. 12 is for illustration only. FIG. 12 does not limit the scope of the present disclosure to any particular implementation.

FIG. 12 respectively illustrates two examples for the SS-TWR and DS-TWR with three message exchanges, other examples are not precluded. A ranging round can start with a ranging control period to exchange the ranging configuration over the UWB MAC. However, a ranging round can also start with a polling period if the ranging configuration is exchanged at the higher layer.

For the SS-TWR, one ranging round contains a PP and an RRP. For the DS-TWR with three messages, one ranging round contains a first PP, an RRP, and a second PP. Each period consists of one or more time slots, where transmissions from initiator(s)/responder(s) can be scheduled as determined by the next higher layer.

The IEEE specification supports the ranging round to fulfill ranging between one initiator and one responder, while different ranging rounds have to be launched if multiple ranging pairs exists. For example, with M initiators and N responders, there may be M*N ranging rounds, which involve at least 2*M*N and 3*M*N message exchanges in total for SS-TWR and DS-TWR respectively. Aiming to reduce the energy cost of transmissions and overall latency to fulfill ranging between many initiators and many responders (M2M), the present disclosure explores the optimized transmission procedure based on either scheduling or contention. In the next sub-clause, existed/modified ranging IEs from are introduced, which may be used in the embodiments to illustrate the optimized transmission for the M2M ranging.

Referring to the payload IEs for ranging control and the transfer of time stamps from the IEEE 802.15.8 document and other disclosures, relevant ranging IEs are introduced here to accommodate the mechanism of optimized transmission in the present disclosure.

Figure 13:
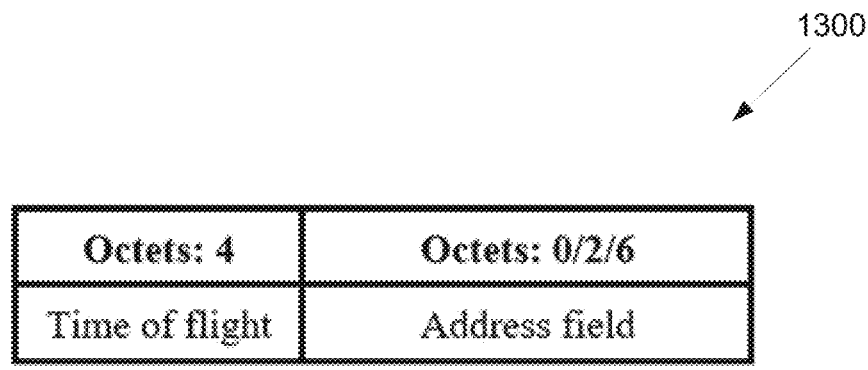
FIG. 13 illustrates an example ranging time-of-flight IE content field format according to embodiments of the present disclosure.

FIG. 13 illustrates an example ranging time-of-flight IE content field format 1300 according to embodiments of the present disclosure. The embodiment of the ranging time-of-flight IE content field format 1300 illustrated in FIG. 13 is for illustration only. FIG. 13 does not limit the scope of the present disclosure to any particular implementation.

RTOF IE can be used to communicate the ranging result to the far end if the RTOF IE is requested. Since multiple ranging results between a device and others can be embedded into one data frame, MAC address or other short addresses, e.g., multicast group address can be added to this IE so that the device can extract the ranging result dedicated to it. If a single pair of devices participates in the ranging round, there is no need to use the address field. An example of RTOF IE content field format is shown in FIG. 13; other examples are not precluded.

Figure 14:
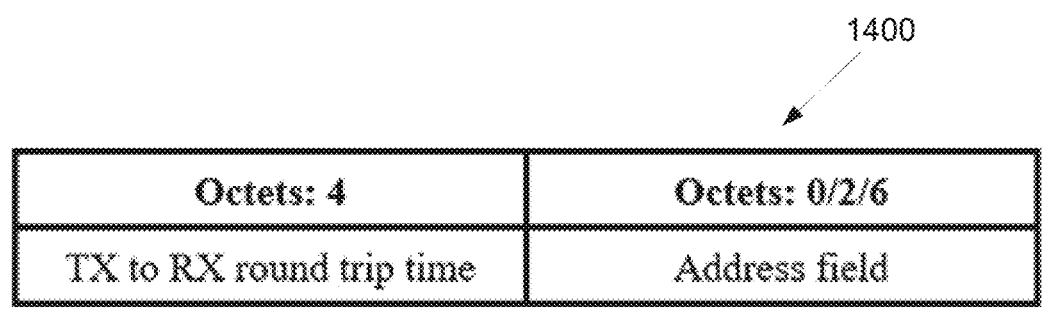
FIG. 14 illustrates an example ranging roundtrip measurement IE content field format according to embodiments of the present disclosure.

FIG. 14 illustrates an example ranging roundtrip measurement IE content field format 1400 according to embodiments of the present disclosure. The embodiment of the ranging roundtrip measurement IE content field format 1400 illustrated in FIG. 14 is for illustration only. FIG. 14 does not limit the scope of the present disclosure to any particular implementation.

The ranging roundtrip measurement IE (RRTM IE) content includes the time difference between the transmit time of the ranging frame (RFRAME) initiating a roundtrip measurement and the receive time of the response RFRAME per source address that completes a roundtrip. If a single pair of devices participates in the ranging round, there is no need to use the address field. An example RRTM IE content field format is shown in FIG. 14; other examples are not precluded.

Figure 15:
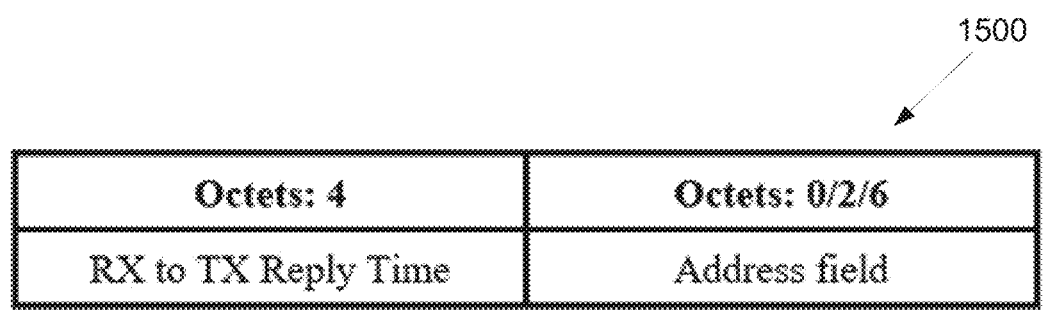
FIG. 15 illustrates an example ranging reply time instantaneous IE content field format according to embodiments of the present disclosure.

FIG. 15 illustrates an example ranging reply time instantaneous IE content field format 1500 according to embodiments of the present disclosure. The embodiment of the ranging reply time instantaneous IE content field format 1500 illustrated in FIG. 15 is for illustration only. FIG. 15 does not limit the scope of the present disclosure to any particular implementation.

The RRTI IE content includes the time difference between the receive time of most recently received RFRAME per source address and the transmit time of the RFRAME containing the IE. If a single pair of devices participates in the ranging round, there is no need to use the address field. An example RRTI IE content field format is shown in FIG. 15; other examples are not precluded.

Figure 16:
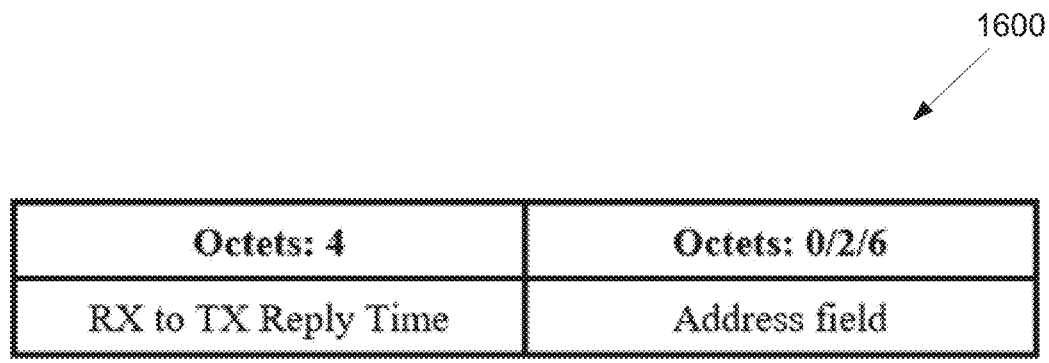
FIG. 16 illustrates an example ranging reply time deferred IE content field format according to embodiments of the present disclosure.

FIG. 16 illustrates an example ranging reply time deferred IE content field format 1600 according to embodiments of the present disclosure. The embodiment of the ranging reply time deferred IE content field format 1600 illustrated in FIG. 16 is for illustration only. FIG. 16 does not limit the scope of the present disclosure to any particular implementation.

The ranging reply time deferred IE (RRTD IE) content includes the time difference between the receive time of most recently received RFRAME per source address and the transmit time of the responding RFRAME transmitted, sent most recently before the frame containing this IE. If a single pair of devices participates in the ranging round, there is no need to use the address field. An example RRTD IE content field format is shown in FIG. 16; other examples are not precluded.

Figure 17:
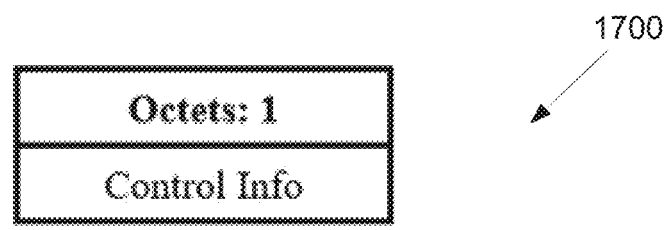
FIG. 17 illustrates an example ranging control single-sided TWR IE content field format according to embodiments of the present disclosure.

FIG. 17 illustrates an example ranging control single-sided TWR IE content field format 1700 according to embodiments of the present disclosure. The embodiment of the ranging control single-sided TWR IE content field format 1700 illustrated in FIG. 17 is for illustration only. FIG. 17 does not limit the scope of the present disclosure to any particular implementation.

The RCST IE is used to control SS-TWR message exchange. An example RCST IE content field format is shown in FIG. 17 and TABLE 1; other examples are not precluded.

TABLE 1

Values of the control information field in the ranging report control single-sided TWR IE

| Control Information value | Meaning |
| --- | --- |
| 0 | This frame indicates that the responding end does not require TX-to- RX roundtrip time and ranging result |
| 1 | This frame indicates that the responding end requires TX-to-RX roundtrip time at the end of exchange |
| 2 | This frame indicates that the responding end requires ranging result at the end of exchange |

The RCDT IE is used to control DS-TWR message exchange. An example RCDT IE content field format is shown in FIG. 18 and TABLE 2; other examples are not precluded.

Figure 18:
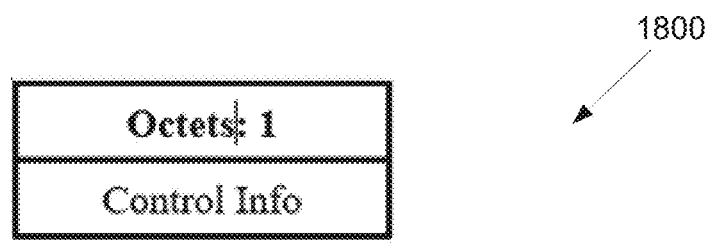
FIG. 18 illustrates an example ranging control double-sided TWR IE content field format according to embodiments of the present disclosure.

FIG. 18 illustrates an example ranging control double-sided TWR IE content field format 1800 according to embodiments of the present disclosure. The embodiment of the ranging control double-sided TWR IE content field format 1800 illustrated in FIG. 18 is for illustration only. FIG. 18 does not limit the scope of the present disclosure to any particular implementation.

TABLE 2

Values of the control information field in the ranging report control double-sided TWR IE

| Control Information value | Meaning |
| --- | --- |
| 0 | This frame is initiating DS-TWR and indicates that the initiating end does not require $1^{st}$ reply time, $2^{nd}$ TX-to-RX roundtrip time or the ranging result |
| 1 | This frame is initiating DS-TWR and indicates that initiating end requires $1^{st}$ reply time and $2^{nd}$ TX-to-RX roundtrip time at the end of exchange |
| 2 | This frame is initiating DS-TWR and indicates that initiating end requires ranging result at the end of exchange |
| 3 | This frame is continuing the DS-TWR, forming the request for the $2^{nd}$ TX-to-RX roundtrip measurement |

In the development of IEEE 802.15.4z, the main enhancement for secure ranging is the inclusion a scrambled timestamp sequence (STS) in the basic PHY protocol data unit (PPDU) format. Since the unique STS of a device is known by one or more far ends in a trusted group, the secure ranging can be performed within the trusted group, and the chance of being attacked is significantly reduced. In the present disclosure, the framework is built upon the fact that STSs of devices have been exchanged successfully, which can be done via, e.g., higher layer control or out-of-band management. How to initialize/update STS and exchange STS between devices is out of the scope of the present disclosure.

Figure 19:
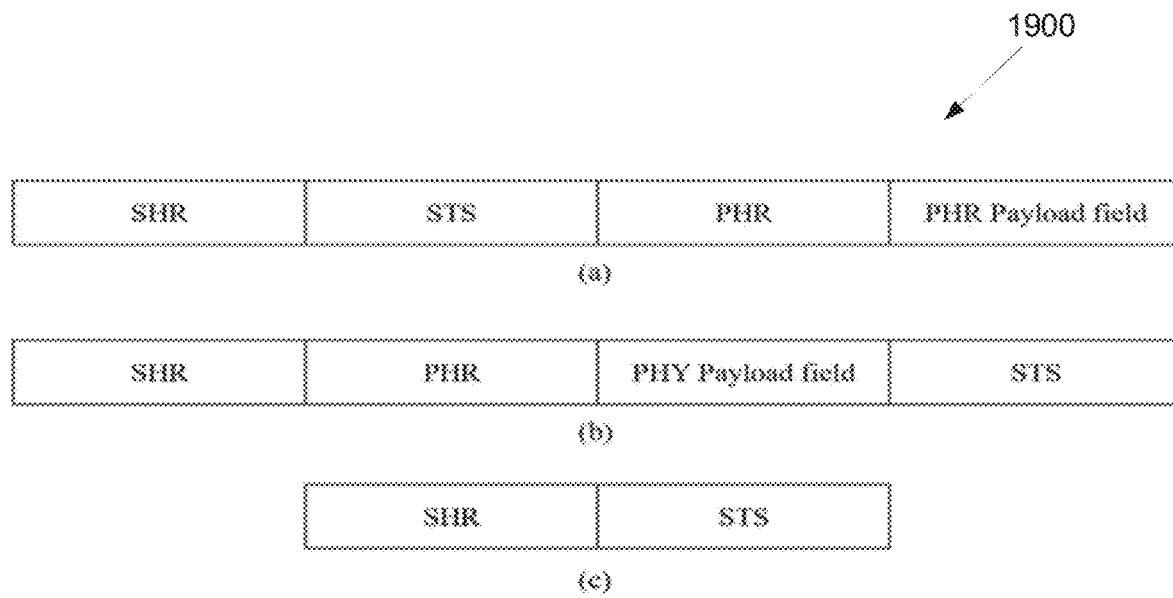
FIG. 19 illustrates an example three secure ranging PPDU formats according to embodiments of the present disclosure.

FIG. 19 illustrates an example three secure ranging PPDU formats 1900 according to embodiments of the present disclosure. The embodiment of the three secure ranging PPDU formats 1900 illustrated in FIG. 19 is for illustration only. FIG. 19 does not limit the scope of the present disclosure to any particular implementation.

Three secure ranging PPDU formats may be supported, the difference between the formats being the location of the STS and existence of a PHR and PHY payload field as shown in FIG. 19. Abbreviations in FIG. 19 represent the following definitions, respectively: SHR (synchronization header), STS (scrambled timestamp sequence), and PHR (PHY header).

The locations of STS are different in FIG. 19 (e.g., (a) and (b)). For the format of FIG. 19 (e.g., (c)), there is no PHY header or data field (NHD) that it may be called as the ranging based on PPDU format of FIG. 19 (e.g., (c)) as NHD secure ranging. Other conventions which fulfill similar concepts are not precluded in the present disclosure.

FIG. 20 illustrates an example ranging request measurement and control IE content field format 2000 according to embodiments of the present disclosure. The embodiment of the ranging request measurement and control IE content field format 2000 illustrated in FIG. 20 is for illustration only. FIG. 20 does not limit the scope of the present disclosure to any particular implementation.

FIG. 21 illustrates an example RRMC table row element format 2100 according to embodiments of the present disclosure. The embodiment of the RRMC table row element format 2100 illustrated in FIG. 21 is for illustration only. FIG. 21 does not limit the scope of the present disclosure to any particular implementation.

The ranging request measurement and control IE (RRMC IE) can be used to send ranging requests to different devices, and control ranging procedures. FIG. 20 illustrates the content field format for the RRMC IE, where row element is shown in FIG. 21.

As shown in the FIG. 21, the length of the RRMC IE content field determines the presence of the RRMC table length and RRMC table fields: if a length is one octet, the RRMC table length and RRCM table are not present; if the length is more than one octet, the RRMC table length and RRCM table are present. RRMC table length equals the number of row elements in the RRMC table, which is the same as the number of devices receiving requests.

If the RRMC IE is conveyed in a unicast frame, the destination address has been specified by the MHR. Therefore, the RRMC table length and RRMC table fields are not needed. When the RRMC IE is conveyed in a broadcast message, the device sending this IE intends to request all devices receiving it, then RRMC table length and RRMC table fields are not needed either. However, if the requesting device expects responses from a specified set of devices, RRMC table length and RRMC table fields are present to list addresses of those devices.

Reply time request (RTR) field denotes whether the reply time of ERDEV sending response to the message with this RRMC IE is requested: if RTR field value is one, the reply time is requested, otherwise it is not.

Round-trip measurement request (RMR) field indicates whether the roundtrip measurement of ERDEV upon receiving the message with this RRMC IE is requested: if RMR field value is one, the roundtrip measurement is requested, otherwise it is not.

TOF request (TOFR) field denotes whether the ranging result, i.e., time-of-flight, is requested: if TOFR field value is one, the ranging result is requested, otherwise it is not. For the SS-TWR, the initiator is able to calculate the TOF after the ranging transmissions. The responder can request the TOF by setting the TOFR field to be one in the RRMC IE of the ranging response message. For the DS-TWR, the Responder is able to calculate the TOF after the ranging. The Initiator can request the TOF by setting the TOFR field to be one in the RRMC IE of the ranging initiation message.

Fields of AOA Azimuth request (AAR) and AOA elevation request (AER) denote whether azimuth AOA, elevation AOA are requested or not: if the field value is one, the corresponding information is requested, otherwise it is not.

With the content field format as shown in FIG. 21, if a device requests different sets of information from different destinations, multiple RRMC IEs can be used in a broadcast message, where different RRMC IEs are used to exchange different sets of requests.

In FIG. 21, the address type, i.e., 2-octet or 8-octet address, can be specified by the DstAddrMode of MCPS-DATA.request.

The value of the ranging control information field is illustrated in the following TABLE 3, which is used to indicate the usage of the RFRAME.

TABLE 3

Values of the ranging control information field in the RRMC IE

| Control Information value | Meaning |
| --- | --- |
| 0 | This RFRAME is the ranging initiation message for the SS-TWR |
| 1 | This RFRAME is responding to the ranging initiation message of SS-TWR |
| 2 | This RFRAME is the ranging initiation message for the DS-TWR. |
| 3 | This RFRAME transmitted from ranging responder is continuing the DS-TWR and initiating the second roundtrip measurement. |

FIG. 22 illustrates an example ranging measurement information IE content field format 2200 according to embodiments of the present disclosure. The embodiment of the ranging measurement information IE content field format 2200 illustrated in FIG. 22 is for illustration only. FIG. 22 does not limit the scope of the present disclosure to any particular implementation.

FIG. 23 illustrates an example RMI table row element format 2300 according to embodiments of the present disclosure. The embodiment of the RMI table row element format 2300 illustrated in FIG. 23 is for illustration only. FIG. 23 does not limit the scope of the present disclosure to any particular implementation.

The ranging measurement information IE (RMI IE) can be used to send ranging-related measurements to one or more devices. FIG. 22 illustrates the content field format for the RMI IE, where row element is shown in the FIG. 23.

The first bit of the control octet, i.e., address present field, in FIG. 21 is used to indicate whether the address field is present in each row element of the RMI table as shown in FIG. 23: if the address present field value is one, the address field of RMI table row element is present, otherwise it is not. For multi-node ranging, an ERDEV can report measurements via an RMI IE, which lists measurement reports to different destinations in the RMI table. The address field of the RMI table row element is used to distinguish ERDEV that requested certain information. For the unicast ranging, the address field may be omitted.

Bit 1-5 are used to denote whether certain information is present in the row element of the RMI table: if the field value is one, the corresponding information is presented in each row element of the RMI table, otherwise it is not.

Bit 6 of the control octet is used to indicate whether this RMI IE is conveyed in the RFRAME, or in a deferred data message: if a value is zero, this RMI IE is embedded in the RFRAME, otherwise the RMI IE is conveyed in a deferred data message.

In FIG. 23, the RX-to-TX reply time field is the time difference between the receive time of most recently received RFRAME with the RRMC IE from a particular source to request reply time, and the transmit time of the response RFRAME. If the deferred mode field value is zero, the RMI IE reporting the reply time is embedded in the responding RFRAME. If the deferred mode filed value is one, the RMI IE is embedded in a deferred data message, while the conveyed reply time is associated with the most recently transmitted RFRAME before this data message. The TX-to-RX roundtrip time field is the time difference between the transmit time of the RFRAME initiating a roundtrip measurement and the receive time of the response RFRAME that completes a roundtrip measurement. The TOF field contains the time-of-flight estimate.

The reference for these time values, i.e., reply time, roundtrip time, and TOF, is the RMARKER. These time values are all unsigned integer time values, whose time units are ranging counter time unit specified in the IEEE 802.15.4z.

The AOA Azimuth field, if present, reports the estimated angle of arrival in the Azimuth domain of the received RFRAME with the RRMC IE to request azimuth AOA. The AOA Elevation field, if present, reports the estimated angle of arrival in the elevation domain of the received RFRAME with the RRMC IE to request elevation AOA. These fields to report AOA contain unsigned integers. The unit of AOA Azimuth is $2^{-16}$ multiplying 360 degree, while the unit of AOA Elevation is $2^{-16}$ multiplying 180 degree.

If Address field is present in each row element of the RMI table, the address type, i.e., 2-octet or 8-octet address, may be specified by the DstAddrMode of MCPS-DATA.request.

For the scenario with many initiators and many responders, the message exchanges can be scheduled by the controller, and broadcast the scheduling information to multiple controlees via the ranging control frame as shown in FIG. 10. On the other hand, the ranging scheduling can also be exchanged through the higher layer or out-of-band management, e.g., via Bluetooth. The present disclosure does not restrict the method to exchange the scheduling information, and its specified implementation is out of the scope of the present disclosure.

Figure 24:
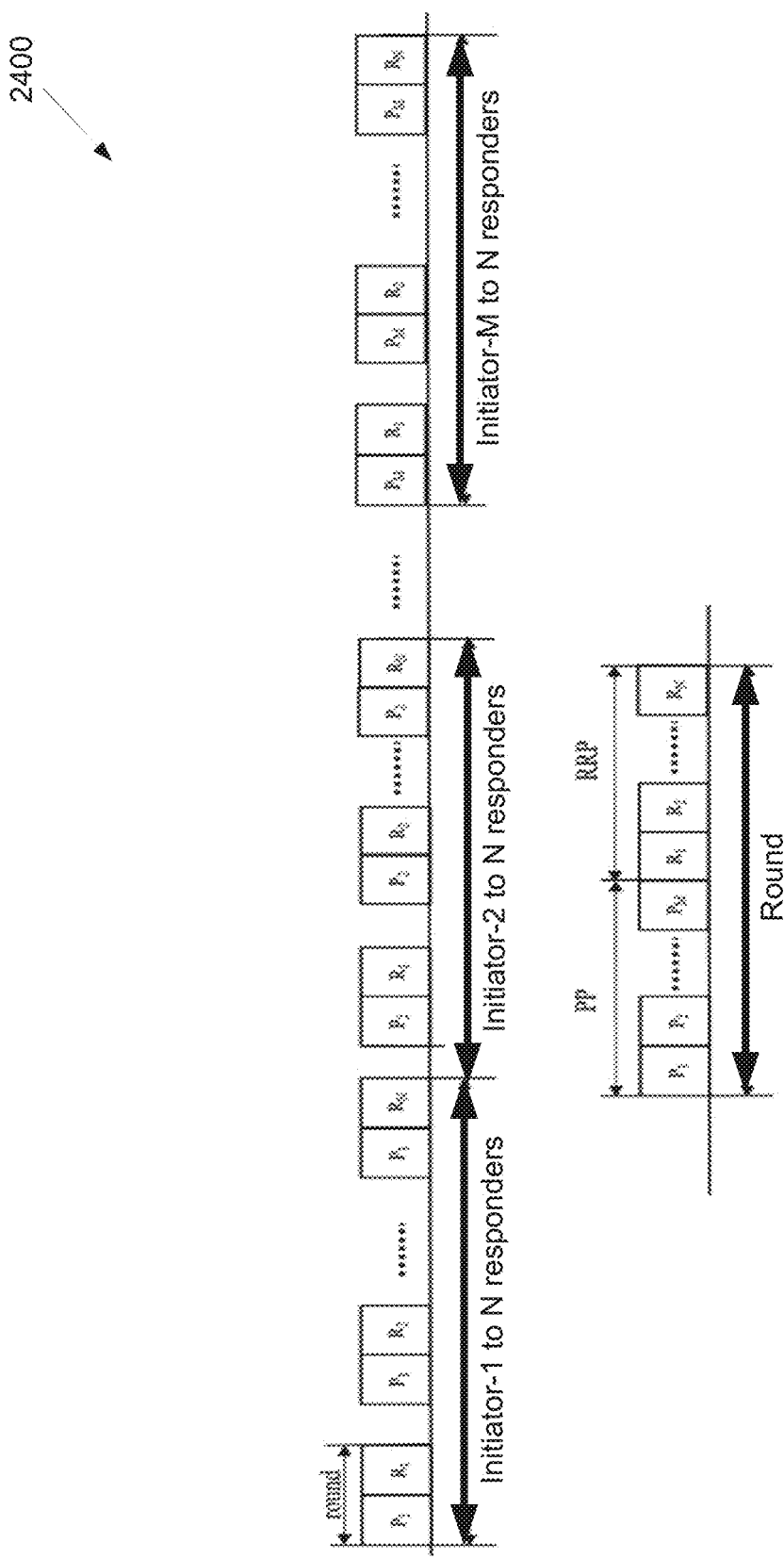
FIG. 24 illustrates an example ranging procedure comparison for scheduling-based M2M SS-TWR according to embodiments of the present disclosure.

FIG. 24 illustrates an example ranging procedure comparison 2400 for scheduling-based M2M SS-TWR according to embodiments of the present disclosure. The embodiment of the ranging procedure comparison 2400 illustrated in FIG. 24 is for illustration only. FIG. 24 does not limit the scope of the present disclosure to any particular implementation.

Without loss of generality, FIG. 24 illustrates the comparison of ranging procedures between the current standard and the optimized transmission for a network with M initiators and N responders, where $P_m$ and $R_n$ represent the poll of the m-th initiator and the response of the n-th responder, respectively. As illustrated in FIG. 24, ranging procedure comparison for scheduling-based M2M SS-TWR is provided for (a) IEEE 802.15.8 standard and (b) optimized transmission.

As illustrated in FIG. 24 (e.g., (a)), the current standard launches N ranging rounds for every initiator, where each round fulfills the ranging between one initiator and one responder. The total number of transmissions is at least 2*M*N. However, in FIG. 24 (e.g., (b)), utilizing the broadcast characteristics of wireless channel, each initiator can send a poll message, which can also be called "ranging initiation message," to initialize ranging with all responders, while each responder can send a ranging response to convey requested information respectively from all initiators, e.g., ranging reply time.

In the scheduling-based mode, the number of time slots in the PP is equivalent to the number of initiators, while the number of time slots in the RRP is equivalent to the number of responders. The total number of transmissions for optimized scheduling-based M2M SS-TWR ranging is M+N, which is significantly less than that of the current standard.

FIG. 25 illustrates an example message sequence chart 2500 for scheduling-based M2M SS-TWR with optimized transmission according to embodiments of the present disclosure. The embodiment of the message sequence chart 2500 illustrated in FIG. 25 is for illustration only. FIG. 25 does not limit the scope of the present disclosure to any particular implementation.

With the ranging IEs in the introduction part, FIG. 25 illustrates one example of message sequence chart for scheduling-based M2M DS-TWR. But other examples are not precluded. All initiators send their respective first polls/ranging initiation messages in the polling period in a scheduled order. The poll can contain the RRRT IE for the initiator to request the reply time from the responder. After collecting the first ranging polls/ranging initiation messages from different initiators, responders respectively form the response frames to convey the IEs of RRTI and RCDT and send them to initiators in the ranging response period based on the scheduling determined by the ranging configuration.

As illustrated in FIG. 24, at the point labeled (R), the initiator has the sufficient information to calculate the ranging result for the corresponding pair. Responders do not request the ranging results by setting the value of RCST IE to be 0. However, responders can also request the ranging results or relevant time stamps from initiators to calculate the ranging results, which need additional data frames transmitted from initiators, respectively. Similar to FIG. 24, FIG. 25 exhibit the message sequence chart with interactions between MAC layer and next higher layer.

Figure 26A:
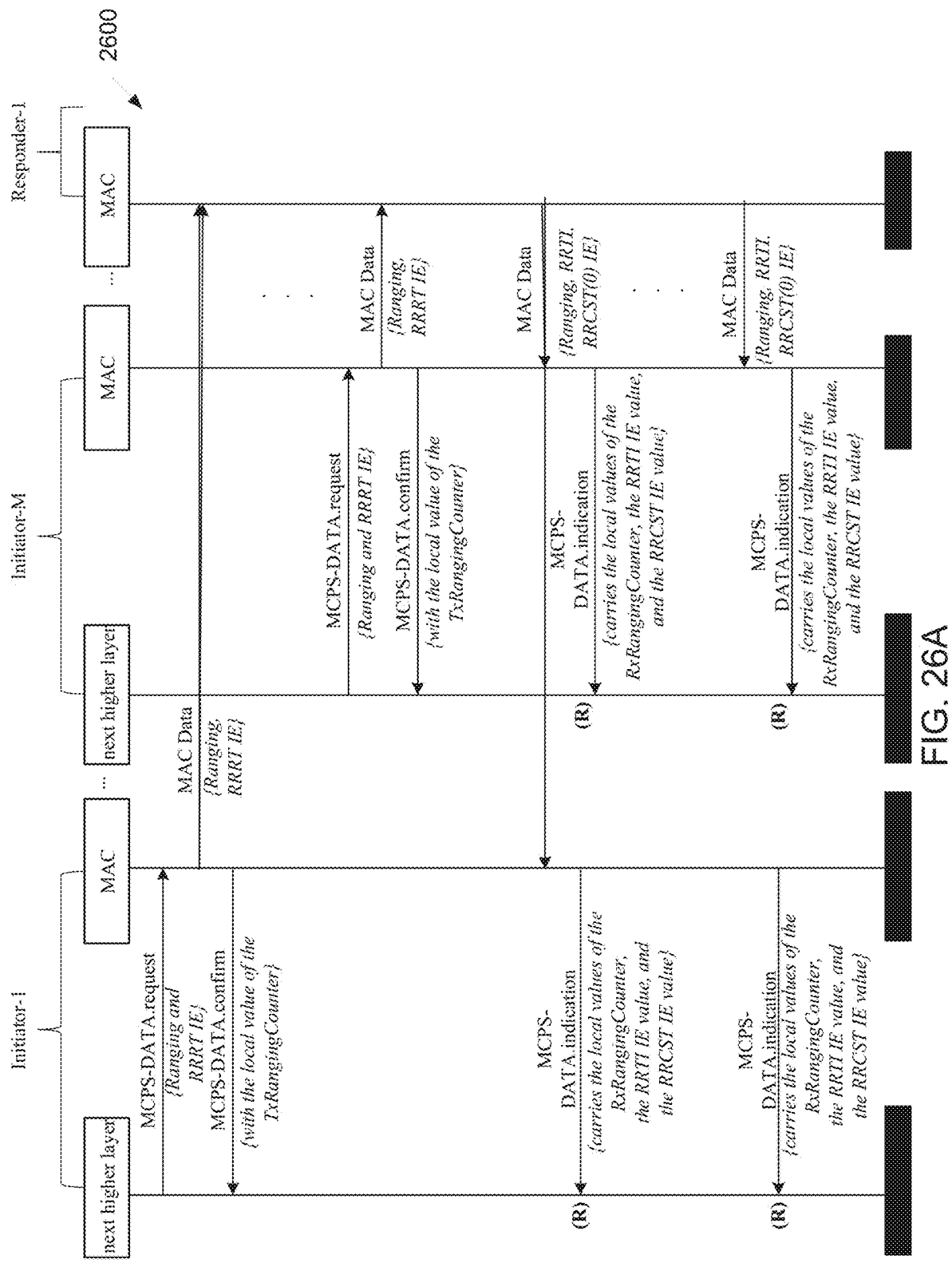
FIG. 26A illustrates an example message sequence chart for scheduling-based M2M SS-TWR with optimized transmission and interactions between next higher layer and MAC layer according to embodiments of the present disclosure.

FIG. 26A illustrates an example message sequence chart 2600 for scheduling-based M2M SS-TWR with optimized transmission and interactions between next higher layer and MAC layer according to embodiments of the present disclosure. The embodiment of the message sequence chart 2600 illustrated in FIG. 26A is for illustration only. FIG. 26A does not limit the scope of the present disclosure to any particular implementation.

Figure 26B:
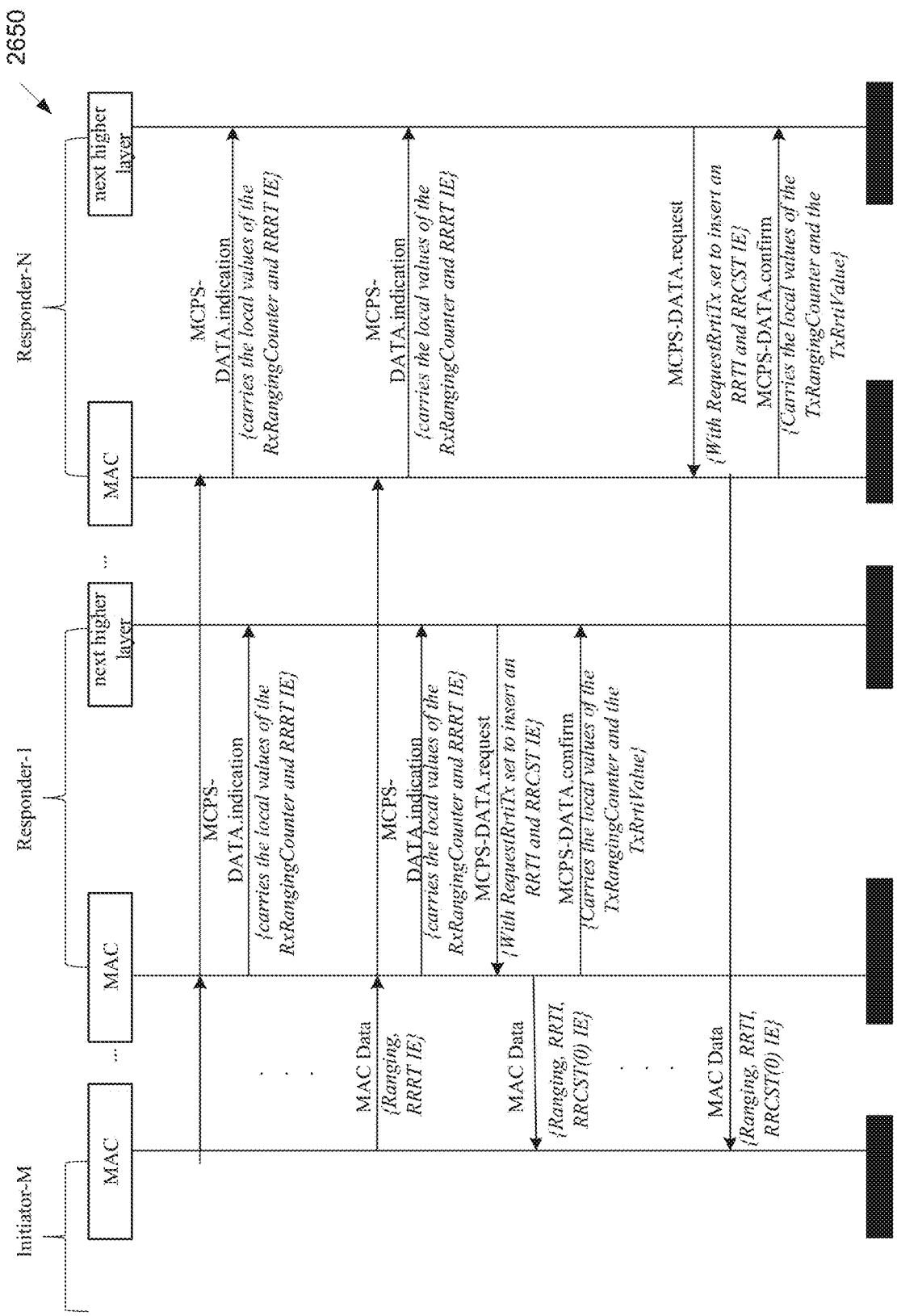
FIG. 26B illustrates an example message sequence chart for scheduling-based M2M SS-TWR with optimized transmission and interactions between next higher layer and MAC layer according to embodiments of the present disclosure.

FIG. 26B illustrates an example message sequence chart 2650 for scheduling-based M2M SS-TWR with optimized transmission and interactions between next higher layer and MAC layer according to embodiments of the present disclosure. The embodiment of the message sequence chart 2650 illustrated in FIG. 26B is for illustration only. FIG. 26B does not limit the scope of the present disclosure to any particular implementation.

FIGS. 26A and 26B illustrate message sequence chart for scheduling-based M2M SS-TWR with optimized transmission and interactions between next higher layer and MAC layer.

FIG. 24 (e.g., (b)) and FIG. 25 illustrate transmission scheme to minimize total number of required ranging transmissions between M initiators and N responders. However, the present disclosure does not preclude other general transmission schemes, which combine schemes of FIG. 24 (e.g., (a) and (b)). Specifically, responder(s) can be scheduled to respond before the completion of ranging initiation messages, or polling frames, from all initiators. This is because a responder may intend to collect ranging initiation messages from a subset of the desired initiators, or a responder may need to respond earlier to fulfill urgent ranging requests. Therefore, ranging periods for ranging initiation messages and response messages can be interlaced to each other.

Figure 27:
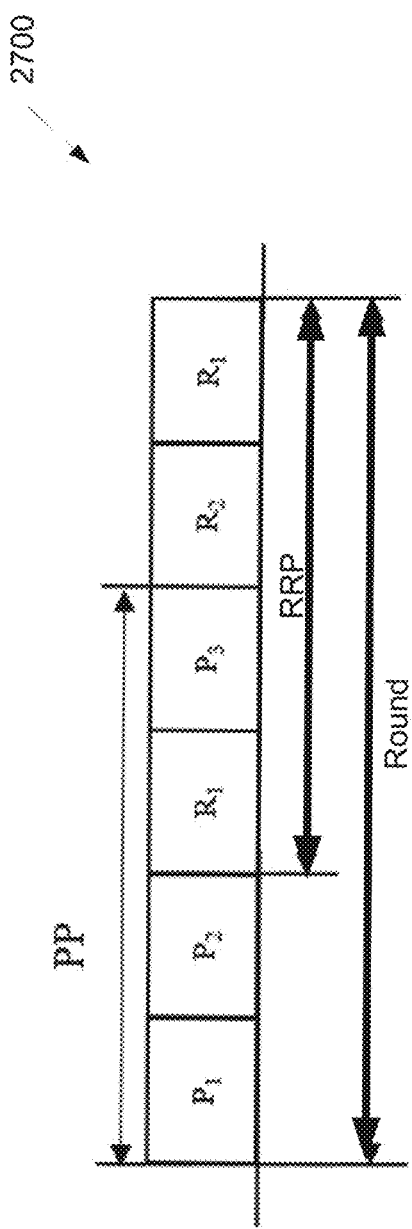
FIG. 27 illustrates an example ranging procedure with interlaced polling and ranging response periods for scheduling-based SS-TWR according to embodiments of the present disclosure.

FIG. 27 illustrates an example ranging procedure 2700 with interlaced polling and ranging response periods for scheduling-based SS-TWR according to embodiments of the present disclosure. The embodiment of the ranging procedure 2700 illustrated in FIG. 27 is for illustration only. FIG. 27 does not limit the scope of the present disclosure to any particular implementation.

An example of interlaced periods with ranging initiation messages and response messages for scheduling-based SS-TWR is illustrated in FIG. 27 between three initiators and two responders. After collecting ranging initiation messages from initiator-1 and initiator-2, responder-1 can be scheduled to send ranging response message to fulfill ranging requests to these two initiators. After responder-2 transmits the ranging response message, responder-1 can be scheduled again to send a ranging response message to initiator-3 if there exists ranging request between responder-1 and initiator-3.

As illustrated in FIG. 27, a ranging round is integrated with interlaced polling and ranging response periods. The number of required transmissions lies in between that of baseline scheme (see FIG. 24, for example (a)) and that of optimized transmission scheme (see FIG. 24. For example (b)). For the example exhibited in FIG. 27, the number of required transmissions is 6, while 2*M*N=12 for baseline scheme, and M+N=5 for optimized transmission scheme.

Figure 28:
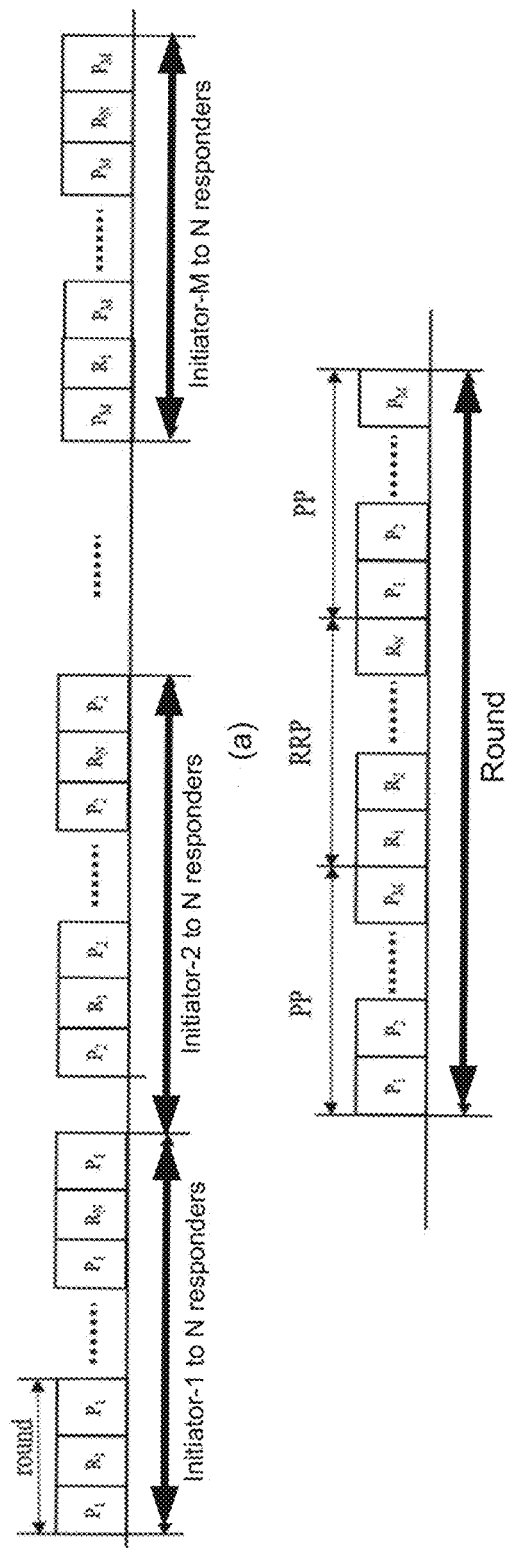
FIG. 28 illustrates an example ranging procedure comparison for scheduling-based M2M DS-TWR according to embodiments of the present disclosure.

FIG. 28 illustrates an example ranging procedure comparison 2800 for scheduling-based M2M DS-TWR according to embodiments of the present disclosure. The embodiment of the ranging procedure comparison 2800 illustrated in FIG. 28 is for illustration only. FIG. 28 does not limit the scope of the present disclosure to any particular implementation.

For the M2M DS-TWR, FIG. 28 illustrates the comparison of ranging procedures between the current IEEE standard and the optimized transmission for a network with M initiators and N responders, where $P_m$ and $R_n$ represent the poll of the m-th initiator and the response of the n-th responder, respectively. In the present disclosure, the optimized transmission is provided for M2M DS-TWR with three message exchanges (see FIG. 8) as an example. The optimized transmission procedure can also be applied to other examples, e.g., the normal DS-TWR with four message exchanges.

FIG. 28 illustrates ranging procedure comparison for scheduling-based M2M DS-TWR, for example (a) IEEE 802.15.8 standard and (b) optimized transmission.

In FIG. 28 (e.g., (a)), similar to FIG. 24 (e.g., (a)), the procedure based on the current standard launches M*N ranging rounds, where each round fulfills the DS-TWR with three messages. The total number of ranging transmissions is 3*M*N. However, with the optimized transmission procedure, polls/ranging responses from initiators/responders are scheduled to transmit sequentially in the PP/RRP, and the total number of ranging transmissions is 2M+N. In the first PP, each poll initializes the first roundtrip measurement between an initiator and all responders, which contains the respective requests from the initiator to the responders. Then, in the follow-up RRP, each responder forms the response RFRAME, which conveys the data respectively requested by initiators, requests from the responder to initiators, and initializes the second roundtrip measurement. In the second PP, each initiator conveys the data respectively requested by responders in a second poll and completes the second roundtrip measurement.

Figure 29:
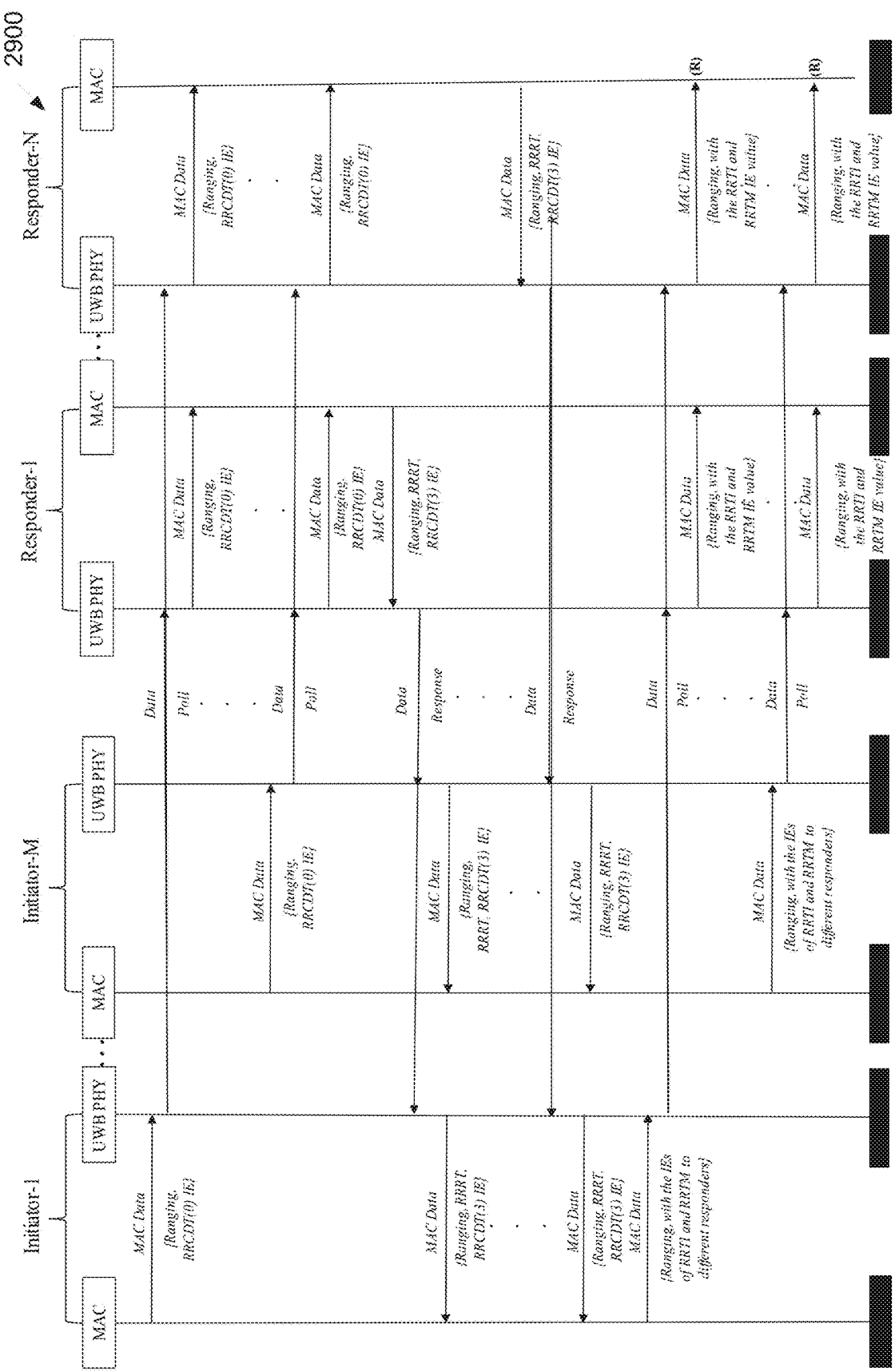
FIG. 29 illustrates an example message sequence chart for scheduling-based M2M DS-TWR with optimized transmission according to embodiments of the present disclosure.

FIG. 29 illustrates an example message sequence chart 2900 for scheduling-based M2M DS-TWR with optimized transmission according to embodiments of the present disclosure. The embodiment of the sequence chart 2900 illustrated in FIG. 29 is for illustration only. FIG. 29 does not limit the scope of the present disclosure to any particular implementation.

With the ranging IEs introduced in the introduction part, FIG. 29 illustrates the message sequence chart for scheduling-based M2M DS-TWR with the optimized transmissions. In the first PP, each initiator transmits a first poll/ranging initiation messages in the scheduled time slot, conveying the RCDT IE, which can be set to zero as shown in FIG. 29, indicating the initiator does not require the ranging results. Other examples with different requests of ranging results are not precluded in the present disclosure.

After the first PP, each responder forms the response frame, containing the RRRT IE to request the second reply time of the initiator, and the RCDT IE with value 3 to request the first TX-to-RX roundtrip time. Then, each initiator forms the final poll, which incorporates the IEs of RRTI and RRTM to different responders, respectively. At the point labeled (R), each responder has the sufficient information to calculate the corresponding ranging result. Similar to FIG. 29, FIGS. 30A and 30B exhibit the message sequence chart with interactions between MAC layer and next higher layer.

Figure 30A:
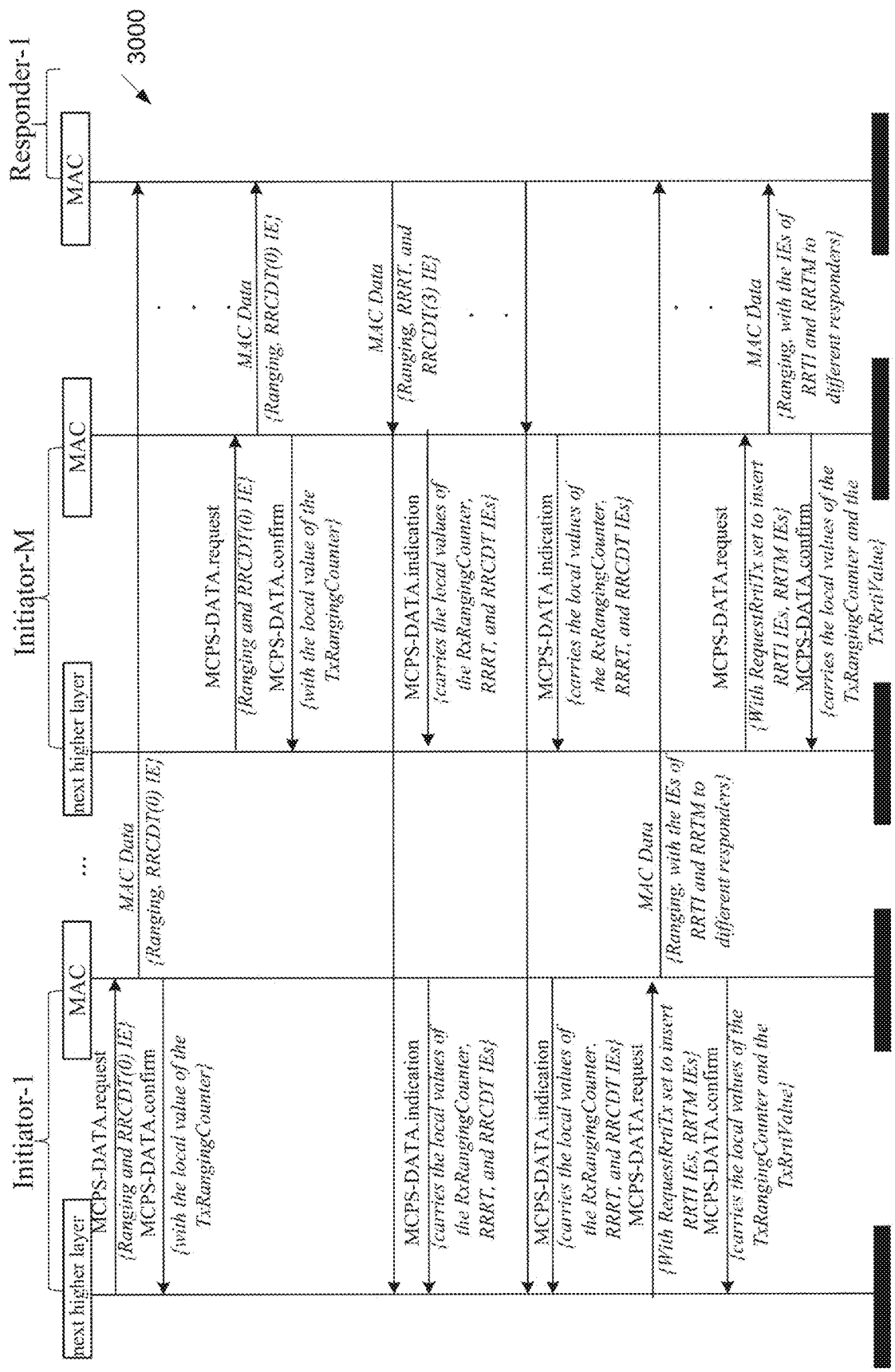
FIG. 30A illustrates an example message sequence chart for scheduling-based M2M DS-TWR with optimized transmission and interactions between next higher layer and MAC layer according to embodiments of the present disclosure.

FIG. 30A illustrates an example message sequence chart 3000 for scheduling-based M2M DS-TWR with optimized transmission and interactions between next higher layer and MAC layer according to embodiments of the present disclosure. The embodiment of the message sequence chart 3000 illustrated in FIG. 30A is for illustration only. FIG. 30A does not limit the scope of the present disclosure to any particular implementation.

Figure 30B:
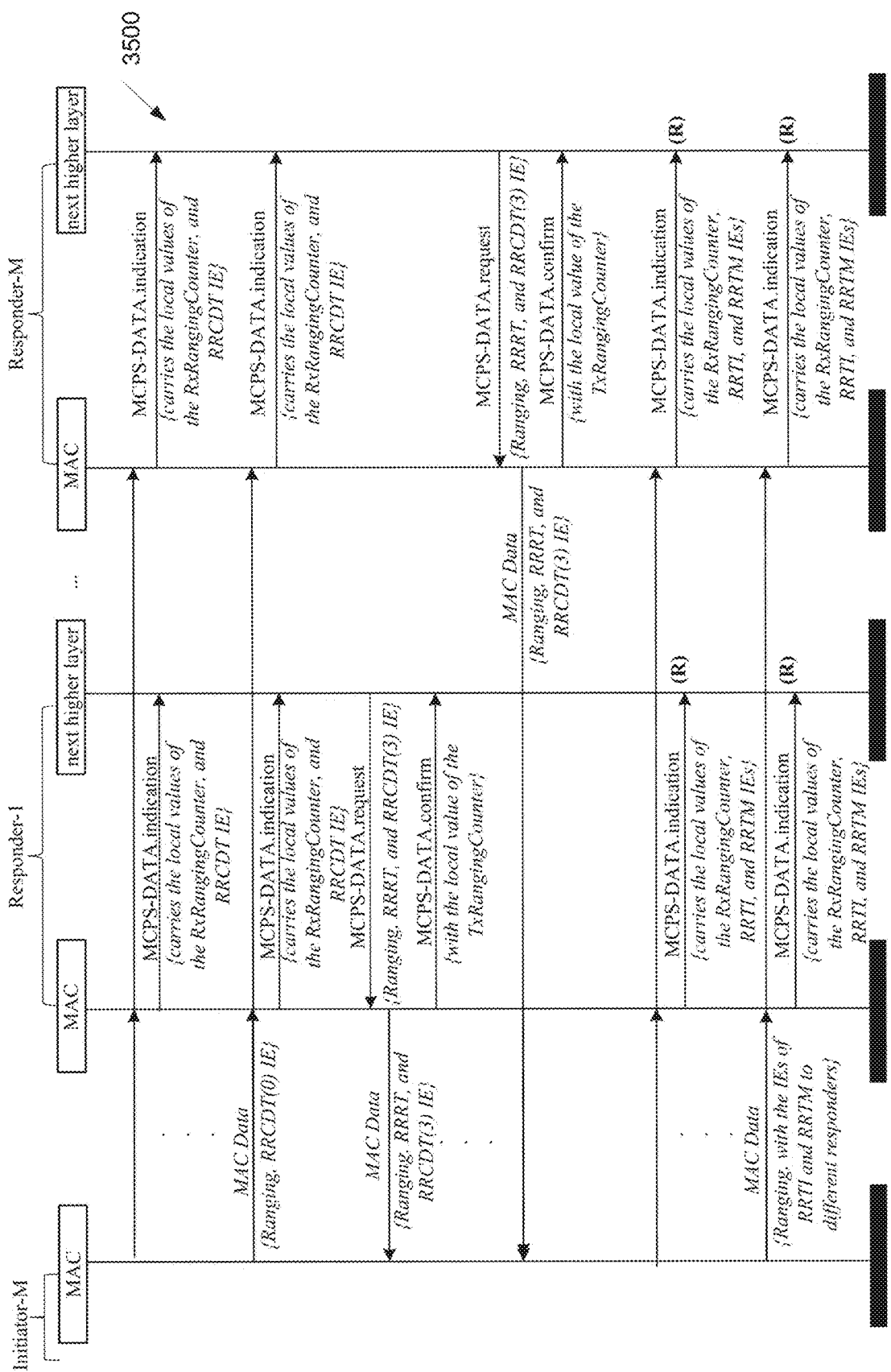
FIG. 30B illustrates another example message sequence chart for scheduling-based M2M DS-TWR with optimized transmission and interactions between next higher layer and MAC layer according to embodiments of the present disclosure.

FIG. 30B illustrates another example message sequence chart 3050 for scheduling-based M2M DS-TWR with optimized transmission and interactions between next higher layer and MAC layer according to embodiments of the present disclosure. The embodiment of the message sequence chart 3050 illustrated in FIG. 30B is for illustration only. FIG. 30B does not limit the scope of the present disclosure to any particular implementation.

Figure 31:
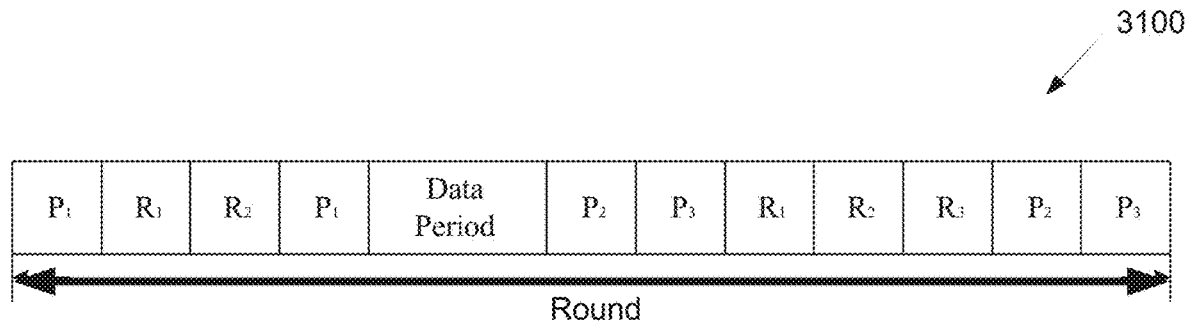
FIG. 31 illustrates an example ranging procedure with interlaced polling and ranging response period for scheduling-based DS-TWR according to embodiments of the present disclosure.

FIG. 28 (e.g., (b)) and FIG. 29 illustrate transmission scheme to minimize total number of required ranging transmissions between M initiators and N responders. However, the present disclosure does not preclude other general transmission schemes, which combine schemes of FIG. 28 (e.g., (a) and (b). Similar to FIG. 27, responder(s) can be scheduled to respond before all initiators transmit the first poll/ranging initiation message. Meanwhile, initiator(s) can also be scheduled to transmit the second poll message before all FIG. 31 illustrates an example ranging procedure 3100 with interlaced polling and ranging response period for scheduling-based DS-TWR according to embodiments of the present disclosure. The embodiment of the ranging procedure 3100 illustrated in FIG. 31 is for illustration only. FIG. 31 does not limit the scope of the present disclosure to any particular implementation.

An example of interlaced periods with ranging initiation messages and response messages for scheduling-based DS-TWR is illustrated in FIG. 31 between three initiators and two responders. In the first 4 time slots of a ranging round, ranging requests are fulfilled between initiator-1 and responder-1/2. There can be a data period, consisting of one or more time slots, to exchange ranging results between initiator-1 and responder-1/2. Then, ranging transmissions in following slots fulfill ranging between initiator-2/3 and responder-1/2/3. The number of required ranging transmissions lies in between that of baseline scheme (see FIG. 28, for example (a)) and that of optimized transmission scheme (see FIG. 28, for example (b)). For the example exhibited in FIG. 31, the number of required transmissions is 11, while 3*M*N=18 for baseline scheme, and 2M+N=8 for optimized transmission scheme.

For the M2M ranging round, depending on the ranging configuration specified by the use case, initiators/responders can also contend for the time slots. The essential idea of optimized transmissions for the contention-based M2M ranging is similar to the scheduled one. For the SS-TWR, each initiator contends for a time slot to send the poll, and initialize ranging with multiple responders, while the responder can collect respective polls from initiators for a certain period of time, and then contend for a time slot to broadcast a response RFRAME to all initiators. For the DS-TWR, after collecting response RFRAMEs for a certain period of time, each initiator then contends to transmit a final poll message.

There can be different variations of defining contending window. The baseline is to define the entire ranging round as the contending window. Consequently, each responder/initiator determines own wait and listen period to collect polls/ranging responses, and then contend for remaining time slots in a round to transmit RFRAME or data frame.

Figure 32:
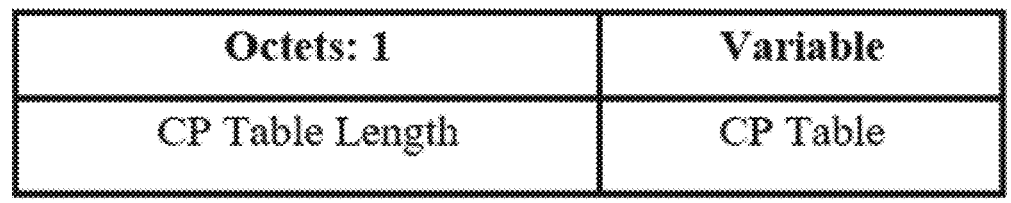
FIG. 32 illustrates an example content fields of contention period IE according to embodiments of the present disclosure.

FIG. 32 illustrates an example content fields of contention period IE 3200 according to embodiments of the present disclosure. The embodiment of the content fields of contention period IE 3200 illustrated in FIG. 32 is for illustration only. FIG. 32 does not limit the scope of the present disclosure to any particular implementation.

Figure 33:
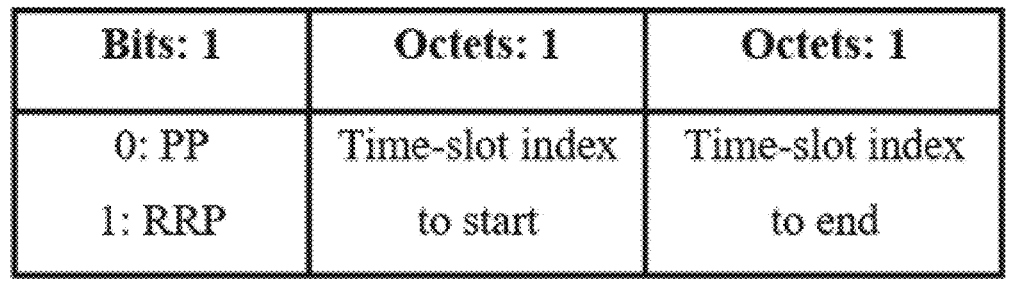
FIG. 33 illustrates an example row of CP table according to embodiments of the present disclosure.

FIG. 33 illustrates an example row of CP table 3300 according to embodiments of the present disclosure. The embodiment of the row of CP table 3300 illustrated in FIG. 33 is for illustration only. FIG. 33 does not limit the scope of the present disclosure to any particular implementation.

Another variation of defining contending window is to divide the ranging round into multiple contention periods, while each contention period is either a PP or an RRP. FIG. 32 and FIG. 33 exhibit one example of the IE content fields to fulfill the functionality of defining different contention periods, while the general IE formats.

Each row of contention period (CP) table represent a contention-based PP/RRP, and the assigned time slots between the start index and the end index. The CP table length indicates the number of rows in the CP table, which is equivalent to number of contention periods in a round.

FIG. 33 illustrates a general example of the CP configuration. However, it does not preclude other simplified realizations for specified use cases. For example, consider ranging devices purely based on the SS-TWR, a ranging round contains one PP and one RRP. Therefore, to embed the time slot index when PP may end in this IE may be already enough to convey CP configuration. Similarly, for ranging devices based on the DS-TWR, whose ranging round can contain a first PP, a RRP, and a second PP, to embed the time slot indices when PPs may end may be enough to exchange the CP configuration and can save more bits compared with that of FIG. 33. The CP IE can be broadcast by the controller to the controlees in the ranging control frame over the UWB MAC as illustrated in FIG. 10. Other methods to exchange the CP configuration via the higher layer or out-of-band management are not precluded in the present disclosure.

FIG. 33 specifies the contention periods for ranging transmissions, i.e., polling periods and ranging response periods. Depending on specific applications and device capabilities, data exchanges can also contend for time slots in data period (DP) of FIG. 11, which is not precluded in the present disclosure. To include the option for contention-based data period, content fields of CP IE exhibited in FIG. 32 remains the same, while a row of CP table can be formatted as FIG. 34.

To treat the entire ranging round as the contending window (S1) or divide the ranging round into multiple CPs (S2), the present disclosure does not restrict to either one of two schemes. Depending on the device capabilities, either one of two schemes can be implemented, or the mode to operate on one of two schemes is configurable by the ranging controller or the next higher layer.

Figure 34:
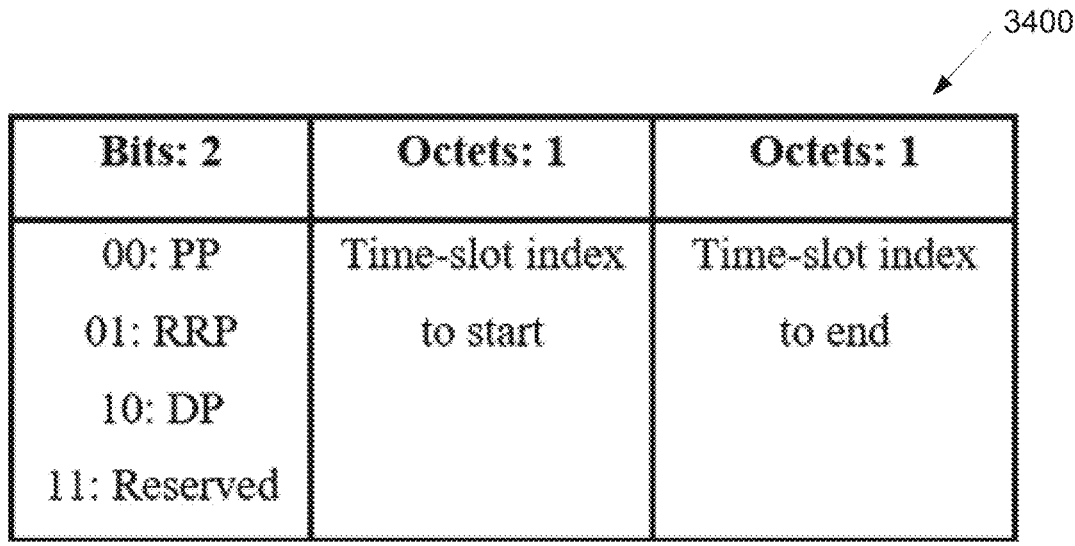
FIG. 34 illustrates another example row of CP table according to embodiments of the present disclosure.

FIG. 34 illustrates another example row of CP table 3400 according to embodiments of the present disclosure. The embodiment of the row of CP table 3400 illustrated in FIG. 34 is for illustration only. FIG. 34 does not limit the scope of the present disclosure to any particular implementation.

Other bit combinations of the content field are not precluded by the present disclosure. For example, to align the size of a CP table row with multiple octets, FIG. 33 and FIG. 34 can be extended to FIG. 35 and FIG. 36, respectively.

Figure 35:
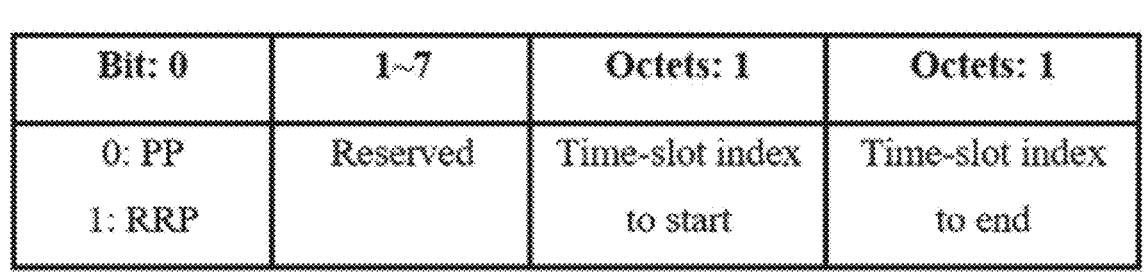
FIG. 35 illustrates an example row of CP table with reserved bits according to embodiments of the present disclosure.

FIG. 35 illustrates an example row of CP table with reserved bits 3500 according to embodiments of the present disclosure. The embodiment of the row of CP table with reserved bits 3500 illustrated in FIG. 35 is for illustration only. FIG. 35 does not limit the scope of the present disclosure to any particular implementation.

Figure 36:
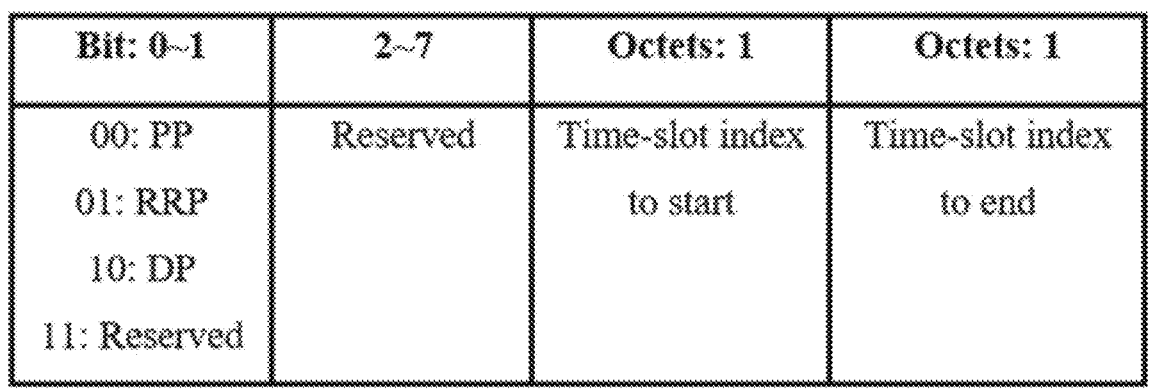
FIG. 36 illustrates another example row of CP table with reserved bits according to embodiments of the present disclosure.

FIG. 36 illustrates another example row of CP table with reserved bits 3600 according to embodiments of the present disclosure. The embodiment of the row of CP table with reserved bits 3600 illustrated in FIG. 36 is for illustration only. FIG. 36 does not limit the scope of the present disclosure to any particular implementation.

As FIG. 11 illustrates, within a ranging round, RFRAMEs are based on one or more PPDU formats in FIG. 19 for secure ranging. However, the data frames transmitted in data period/phase may not utilize the PPDU format with STS. For contention-based ranging, with an extra field to indicate the STS mode, the contention period IE introduced in Scheme 4 can also be used to specify the PPDU format used by RFRAMEs/data frames in the period. An example of content field can be found in FIG. 32 and FIG. 37.

FIG. 37 illustrates an example row in CP table with STS mode 3700 according to embodiments of the present disclosure. The embodiment of the row in CP table with STS mode 3700 illustrated in FIG. 37 is for illustration only. FIG. 37 does not limit the scope of the present disclosure to any particular implementation.

In each row of CP table illustrated in FIG. 37, the first field is a period indicator to indicate whether initiator(s) or responder(s) can contend for this period. If a value is zero, initiator(s) can contend this polling period (PP); otherwise, responders can contend this ranging response period (RRP). The second field is to indicate the PPDU format that ranging device may use for the corresponding period. An example setting of STS mode field can be: "00" indicates PPDU format without STS, namely STS mode 0 (SM0); "01" denotes PPDU format of FIG. 19 (e.g., (a)), namely STS Mode 1 (SM1); "10" denotes PPDU format of FIG. 19 (e.g., (b)), namely STS mode 2 (SM2); "11" indicates PPDU format of FIG. 19 (e.g., (c)), namely STS mode 3 (SM3).

Other structures of content fields to fulfill similar function are not precluded in the present disclosure. For example, depending on the device capability and specific applications, ranging devices are capable of supporting PPDU formats of SM0 and SM1 (or SM2). Then, one-bit field can be used for STS Mode, which reduces a row of CP table in FIG. 37 to the one in FIG. 38.

FIG. 38 illustrates another example row in CP table with STS mode 3800 according to embodiments of the present disclosure. The embodiment of the row in CP table with STS mode 3800 illustrated in FIG. 38 is for illustration only. FIG. 38 does not limit the scope of the present disclosure to any particular implementation.

An example setting of STS mode field in FIG. 38 can be: "0" indicates the PPDU format of SM0, while "1" denotes the PPDU format of SM1.

The row element of the CP table as illustrated in the FIG. 33 can be reduced to the following structure, which occupies two octets.

FIG. 39 illustrates an example row element in the CP table 3900 according to embodiments of the present disclosure. The embodiment of the row element in the CP table 3900 illustrated in FIG. 39 is for illustration only. FIG. 39 does not limit the scope of the present disclosure to any particular implementation.

The control values of the Phase Indicator field are described in the TABLE 4.

TABLE 4

Control values of the Phase Indicator field in FIG. 39.

| Value | Meaning |
| --- | --- |
| 00 | The phase is used for initiators to contend |
| 01 | The phase is used for responders to contend |
| Others | Reserved |

In the development of IEEE 802.15.4z, ranging request measurement control IE (RRMC IE) can be used to exchange requests and control ranging procedure, while ranging measurement information IE (RMI IE) can be used to report the ranging-related measurements and/or angle information. This embodiment elaborates on the ranging procedures and message sequence charts for the M2M ranging based on the RRMC and RMI IEs.

For the scenario of many initiators-to-many responders (M2M), the controller sends the RCM with the ranging configuration to multiple initiators and responders. In the scenario of one-to-many ranging, there is only one ranging initiation message in the ranging initiation phase (RIP) from a single Initiator, while multiple Initiators can send ranging initiation messages in the RIP through either scheduling or contention in the M2M ranging. The ranging initiation message contains the RRMC IE, where the ranging control information field value is set to be zero, and the reply time request field value is set to be one. After collecting ranging initiation messages from different initiators, responders form the RMI, RRMC IEs, and send them to initiators in the ranging response phase based on the time-scheduling or contention determined via the ranging configuration.

Figure 40A:
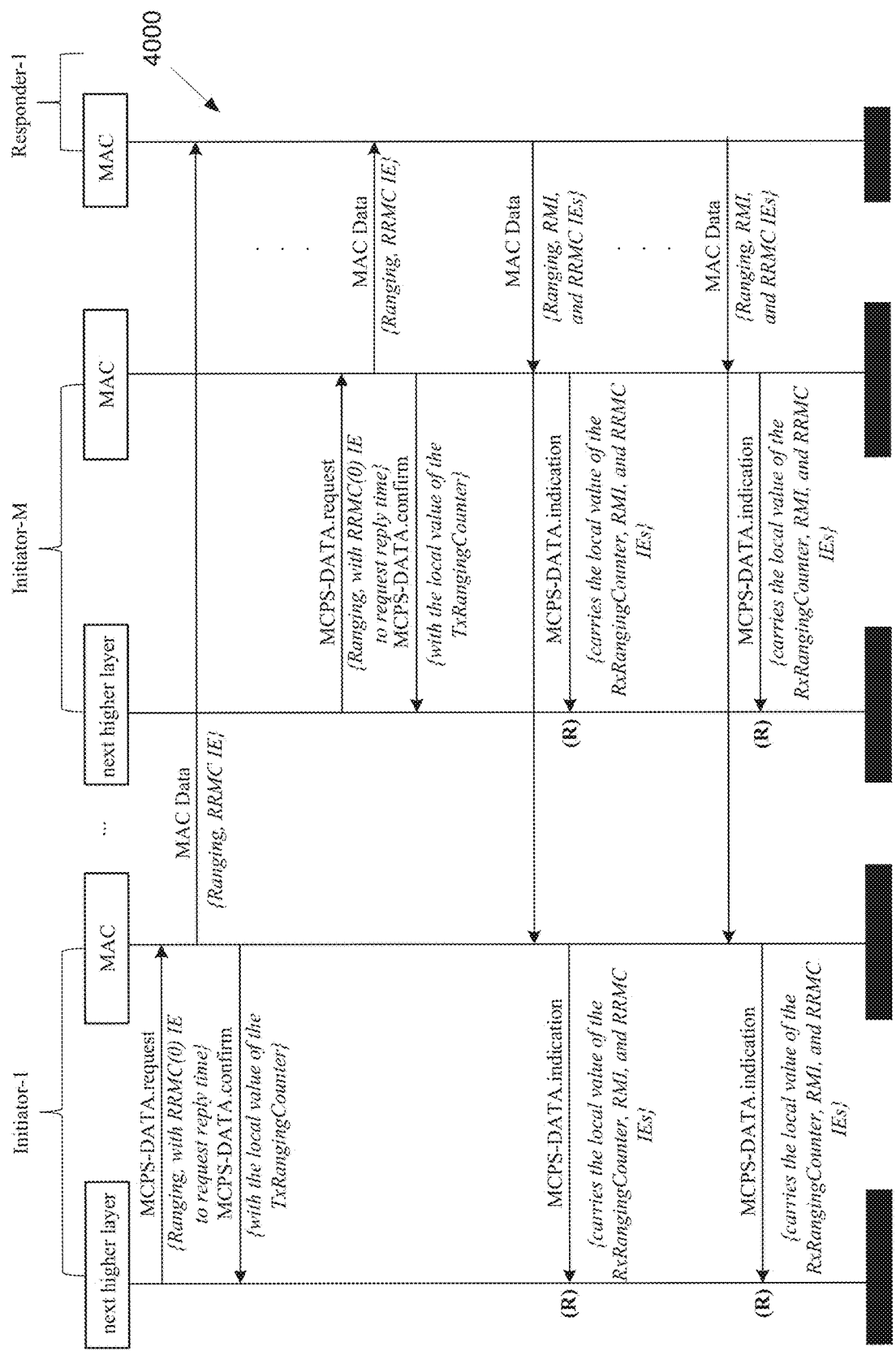
FIG. 40A illustrates an example message sequence chart for M2M SS-TWR with RRMC, RMI IEs according to embodiments of the present disclosure.

FIG. 40A illustrates an example message sequence chart for M2M SS-TWR with RRMC, RMI IEs 4000 according to embodiments of the present disclosure. The embodiment of the message sequence chart for M2M SS-TWR with RRMC, RMI IEs 4000 illustrated in FIG. 40A is for illustration only. FIG. 40A does not limit the scope of the present disclosure to any particular implementation.

Figure 40B:
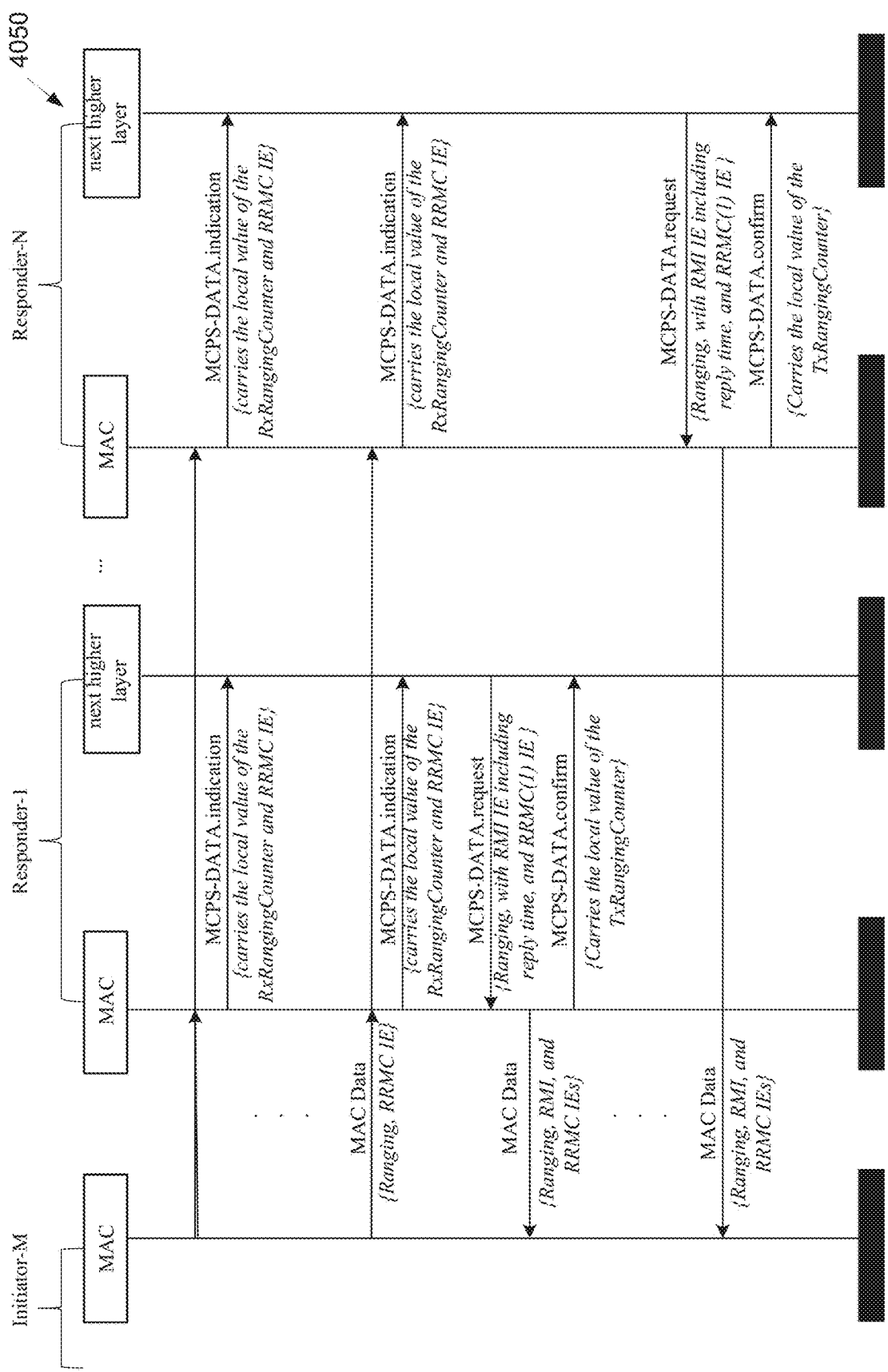
FIG. 40B illustrates another example message sequence chart for M2M SS-TWR with RRMC, RMI IEs according to embodiments of the present disclosure.

FIG. 40B illustrates another example message sequence chart for M2M SS-TWR with RRMC, RMI IEs 4050 according to embodiments of the present disclosure. The embodiment of the message sequence chart for M2M SS-TWR with RRMC, RMI IEs 4050 illustrated in FIG. 40B is for illustration only. FIG. 40B does not limit the scope of the present disclosure to any particular implementation.

FIGS. 40A and 40B illustrate the message sequence chart for M2M SS-TWR between M initiators and N responders, i.e., initiator-1, initiator-2, . . . , initiator-M, and responder-1, responder-2, . . . , responder-N, where transmissions of both ranging initiation and ranging response messages are scheduled in a sequential order. Contention-based transmissions for both ranging initiation phase and ranging response phase can also be performed. At the point labeled (R), the initiator has the sufficient information to calculate the ranging result for the corresponding pair.

It is the responsibility of the higher layers to ensure that each required response is supplied in good time to allow the MAC to transmit each required response at the specified time, and similarly to have enabled the receiver in good time to receive any message MAC needs to receive. The controller can ascertain this using the ARC IE and RDM IE. In FIGS. 40A and 41B, responders do not request the ranging results. However, responders can also request the ranging results or relevant time measurement from initiators to calculate the ranging results, which need additional data frames transmitted from initiators.

Figure 41A:
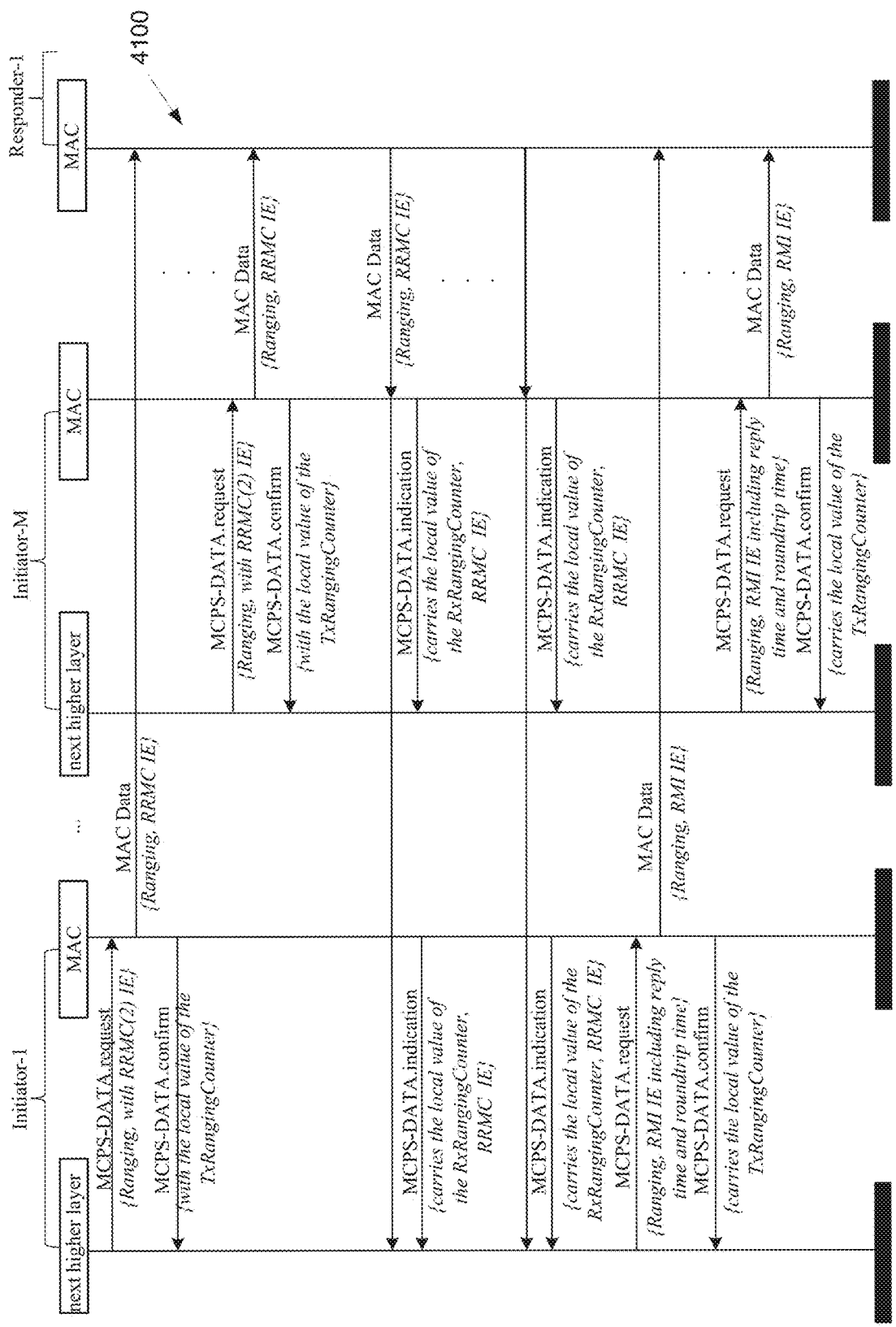
FIG. 41A illustrates an example message sequence chart for M2M DS-TWR with RRMC, RMI IEs according to embodiments of the present disclosure.
Figure 41B:
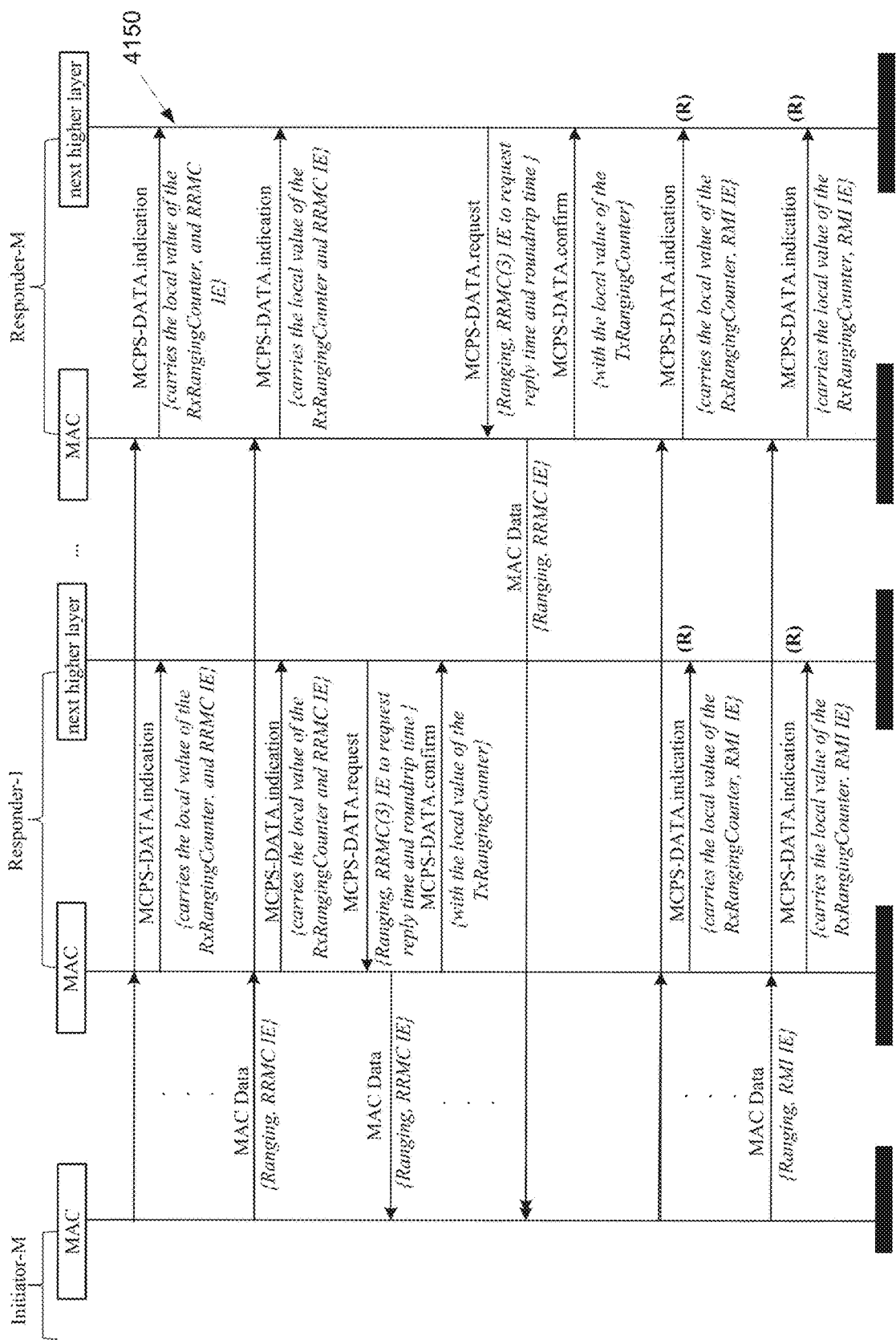
FIG. 41B illustrates another example message sequence chart for M2M DS-TWR with RRMC, RMI IEs according to embodiments of the present disclosure.

FIG. 41A illustrates an example message sequence chart for M2M DS-TWR with RRMC, RMI IEs 4100 according to embodiments of the present disclosure. The embodiment of the message sequence chart for M2M DS-TWR with RRMC, RMI IEs 4100 illustrated in FIG. 41A is for illustration only. FIG. 41A does not limit the scope of the present disclosure to any particular implementation.

FIG. 41B illustrates another example message sequence chart for M2M DS-TWR with RRMC, RMI IEs 4150 according to embodiments of the present disclosure. The embodiment of the message sequence chart for M2M DS-TWR with RRMC, RMI IEs 4150 illustrated in FIG. 41B is for illustration only. FIG. 41B does not limit the scope of the present disclosure to any particular implementation.

For the M2M DS-TWR, based on the ranging configuration, multiple initiators may contend or be time-scheduled for the time slots in the ranging initiation phase to send the ranging initiation messages, which convey RRMC IEs. The ranging control information field value in the RRMC IE may be two, which is indicated by the RRMC (2) IE in FIGS. 41A and 41B.

After the ranging initiation phase, the responder forms the ranging response message, containing the RRMC IE to initialize the second roundtrip measurement. The ranging control information field value may be three, which is indicated by the RRMC (3) IE in FIGS. 41A and 41B. The fields of reply time request and roundtrip time request in the RRMC IE are set to be one. Ranging response messages can also be transmitted through either time-scheduling or contention determined via ranging configuration. Then, the Initiator forms the final RFRAME, which includes the RMI IE to report reply time and roundtrip time.

FIGS. 41A and 41B illustrate the message sequence chart for M2M DS-TWR between M initiators and N responders, where both ranging initiation messages and ranging response messages are scheduled for transmission in a sequential order. At the point labeled (R), responders have sufficient information to calculate the ranging results. If the fields of reply time request, roundtrip measurement request, and TOF request in the RRMC IE in the ranging initiation message are set to be zero, the responder may not send back the ranging result or relevant time measurement to the initiator.

Figure 42:
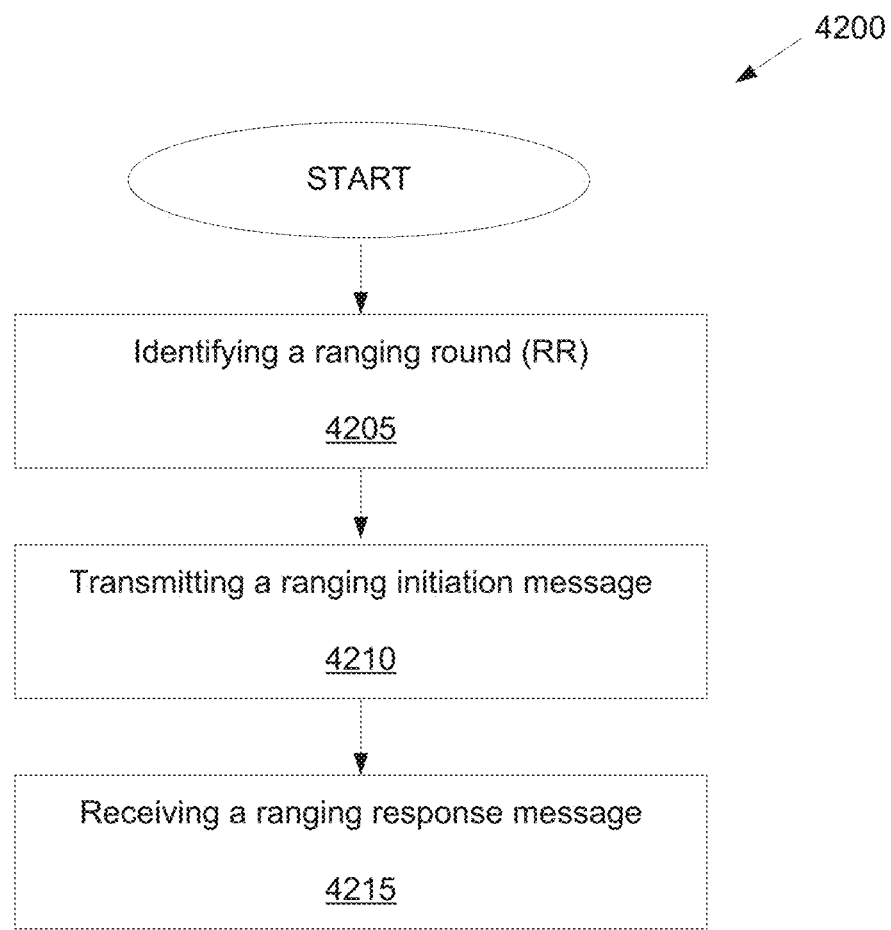
FIG. 42 illustrates a flowchart of method for a ranging operation according to embodiments of the present disclosure.

FIG. 42 illustrates a flowchart of method 4200 for a ranging operation according to embodiments of the present disclosure, as may be performed by a transmit apparatus. The embodiment of the method 4200 illustrated in FIG. 42 is for illustration only. FIG. 42 does not limit the scope of the present disclosure to any particular implementation.

As illustrated in FIG. 42, the method 4200 begins at step 4205. In step 4205, the transmit apparatus (e.g., one ore more transmit apparatus as illustrated in FIG. 6), for a single-sided two-way ranging (SS-TWR), identifies a ranging round (RR) including a ranging initiation phase (RIP) for a set of transmit apparatuses including the transmit apparatus and a ranging response phase (RRP) for a set of receive apparatuses, wherein the RIP and the RRP comprise at least one slot.

In one embodiment, in step 4205, the set of transmit apparatuses including the transmit apparatus transmits, to the set of receive apparatuses in a scheduling mode or a contention-based mode in the RIP and the RFP, the ranging initiation message for a DS-TWR or the SS-TWR; and a ranging final message for the DS-TWR.

In one embodiment, in step 4205, the set of transmit apparatuses including the transmit apparatus receives, from one or more of the set of receive apparatuses, the ranging response message in the scheduling mode or the contention-based mode in the RRP.

Next, in step 4210, the transmit apparatus transmits, to the set of receive apparatuses, a ranging initiation message in the RIP.

Finally, the transmit apparatus in step 4215 receives, from one or more of the set of receive apparatuses, a ranging response message including information requested by the transmit apparatus in the RRP.

In one embodiment, the transmit apparatus, for a double-sided two-way ranging (DS-TWR), identifies a ranging final phase (RFP) included in the RR; and transmits in the RFP in the RR indicating a phase in which the transmit apparatus transmits a ranging final message to one or more of the set of receive apparatuses.

In one embodiment, the transmit apparatus identifies a ranging request measurement control information element (RRMC IE) for a DS-TWR or the SS-TWR.

In one embodiment, the transmit apparatus transmits, to the set of receive apparatuses, the ranging initiation message including the RRMC IE in a contention-based mode or a scheduling mode.

In one embodiment, the transmit apparatus receives, from one or more of the set of receive apparatuses, the ranging response message including information requested by the transmit apparatus in the contention-based mode or the scheduling mode.

In one embodiment, the transmit apparatus transmits, to the set of receive apparatuses and other transmit apparatuses, a ranging contention phase structure IE (RCPS IE) including information of a time structure for the RR.

In one embodiment, the transmit apparatus receives, from one or more of the set of receive apparatuses and other transmit apparatuses, the RCPS IE including the information of the time structure for the RR, the RCPS IE comprising a contention period (CP) table length indicating a CP table and a length of CP table.

In such embodiment, a row element of the CP table includes a period indication field in two bits; a time-slot index to start field; and a time-slot index to end field.

In such embodiment, the period indication field in two bits, to contend, indicates: a polling period for the set of transmit apparatuses; the RRP for the set of receive apparatuses, or a data period (DP) for both the transmit apparatus and the set of receive apparatuses.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A transmit apparatus in a wireless communication system supporting ranging capability, the transmit apparatus comprising:
   a processor configured to, for a single-sided two-way ranging (SS-TWR), identify a ranging round (RR) including a ranging initiation phase (RIP) for a set of transmit apparatuses including the transmit apparatus and a ranging response phase (RRP) for a set of receive apparatuses, wherein the RIP and the RRP comprise at least one slot; and
   a transceiver operably connected to the processor, the transceiver configured to:
   transmit, to the set of receive apparatuses, a ranging initiation message in the RIP; and
   receive, from one or more of the set of receive apparatuses, a ranging response message in the RRP, wherein the ranging response message includes information requested by the transmit apparatus.

2. The transmit apparatus of claim 1, wherein:
   the processor is further configured to, for a double-sided two-way ranging (DS-TWR), identify a ranging final phase (RFP) included in the RR; and
   the transceiver is further configured to transmit in the RFP in the RR indicating a phase in which the transmit apparatus transmits a ranging final message to one or more of the set of receive apparatuses.

3. The transmit apparatus of claim 2, wherein the transceiver is further configured to transmit, to the set of receive apparatuses in a scheduling mode or a contention-based mode in the RIP and the RRP:
   the ranging initiation message for the DS-TWR or the SS-TWR; and
   a ranging final message for the DS-TWR.

4. The transmit apparatus of claim 1, wherein the transceiver is further configured to receive, from one or more of the set of receive apparatuses, the ranging response message in a scheduling mode or a contention-based mode in the RRP.

5. The transmit apparatus of claim 1, wherein:
   the processor is further configured to identify a ranging request measurement control information element (RRMC IE) for a DS-TWR or the SS-TWR; and
   the transceiver is further configured to:
   transmit, to the set of receive apparatuses, the ranging initiation message including the RRMC IE in a contention-based mode or a scheduling mode; and
   receive, from one or more of the set of receive apparatuses, the ranging response message including information requested by the transmit apparatus in the contention-based mode or the scheduling mode.

6. The transmit apparatus of claim 1, wherein the transceiver is further configured, at least one of, to:
transmit, to the set of receive apparatuses and other transmit apparatuses, a ranging contention phase structure IE (RCPS IE) including information of a time structure for the RR, or
receive, from one or more of the set of receive apparatuses and the other transmit apparatuses, the RCPS IE including the information of the time structure for the RR, the RCPS IE comprising a contention period (CP) table length indicating a CP table and a length of CP table.

7. The transmit apparatus of claim 6, wherein a row element of the CP table includes:
a period indication field in two bits, to contend, indicating:
a polling period for the set of transmit apparatuses,
the RRP for the set of receive apparatuses, or
a data period (DP) for both the transmit apparatus and the set of receive apparatuses;
a time-slot index to start field; and
a time-slot index to end field.

8. A receive apparatus in a wireless communication system supporting ranging capability, the receive apparatus comprising:
a transceiver configured to receive, from a transmit apparatus of a set of transmit apparatuses, a ranging initiation message in a ranging initiation phase (RIP); and
a processor operably connected to the transceiver, the processor configured to, for a single-sided two-way ranging (SS-TWR), identify a ranging round (RR) including the RIP for a set of receive apparatuses including the receive apparatus to receive and a ranging response phase (RRP) for the set of transmit apparatuses to receive, the RIP and the RRP comprising at least one slot,
wherein, the transceiver is further configured to transmit, to one or more of the set of transmit apparatuses, a ranging response message in the RRP, wherein the ranging response message includes information requested by the transmit apparatus.

9. The receive apparatus of claim 8, wherein:
the transceiver is further configured to receive a ranging final phase (RFP) in the RR indicating a phase in which the receive apparatus receives a ranging final message from the one or more of the set of transmit apparatuses; and
the processor is further configured to, for a double-sided two-way ranging (DS-TWR), identify the RFP included in the RR.

10. The receive apparatus of claim 9, wherein the transceiver is further configured to receive, from the set of transmit apparatuses in a scheduling mode or a contention-based mode in the RIP and the RRP:
the ranging initiation message for the DS-TWR or the SS-TWR; and
a ranging final message for the DS-TWR.

11. The receive apparatus of claim 8, wherein the transceiver is further configured to transmit, to one or more of the set of transmit apparatuses, the ranging response message in a scheduling mode or a contention-based mode in the RRP.

12. The receive apparatus of claim 8, wherein:
the transceiver is further configured to receive, from the set of transmit apparatuses, the ranging initiation message including a ranging request measurement control information element (RRMC IE) in a contention-based mode or a scheduling mode; and
the processor is further configured to identify the RRMC IE for a DS-TWR or the SS-TWR,
wherein the transceiver is further configured to transmit, to one or more of the set of transmit apparatuses, the ranging response message including information requested by the transmit apparatus in the contention-based mode or the scheduling mode.

13. The receive apparatus of claim 8, wherein the transceiver is further configured, at least one of, to:
receive, from the set of transmit apparatuses and other receive apparatuses, a ranging contention phase structure IE (RCPS IE) including information of a time structure for the RR, or
transmit, to one or more of the set of transmit apparatuses and the other receive apparatuses, the RCPS IE including the information of the time structure for the RR, the RCPS IE comprising a contention period (CP) table length indicating a CP table and a length of CP table.

14. The receive apparatus of claim 13, wherein a row element of the CP table includes:
a period indication field in two bits, to contend, indicating:
a polling period for the set of transmit apparatuses,
the RRP for the set of receive apparatuses, or
a data period (DP) for both the transmit apparatus and the set of receive apparatuses;
a time-slot index to start field; and
a time-slot index to end field.

15. A method of a transmit apparatus in a wireless communication system supporting ranging capability, the method comprising:
for a single-sided two-way ranging (SS-TWR), identifying a ranging round (RR) including a ranging initiation phase (RIP) for a set of transmit apparatuses including the transmit apparatus and a ranging response phase (RRP) for a set of receive apparatuses, wherein the RIP and the RRP comprise at least one slot;
transmitting, to the set of receive apparatuses, a ranging initiation message in the RIP; and
receiving, from one or more of the set of receive apparatuses, a ranging response message in the RRP, wherein the ranging response message includes information requested by the transmit apparatus.

16. The method of claim 15, further comprising:
for a double-sided two-way ranging (DS-TWR), identifying a ranging final phase (RFP) included in the RR; and
transmitting in the RFP in the RR indicating a phase in which the transmit apparatus transmits a ranging final message to one or more of the set of receive apparatuses.

17. The method of claim 16, further comprising:
transmitting, to the set of receive apparatuses in a scheduling mode or a contention-based mode in the RIP and the RRP:
the ranging initiation message for the DS-TWR or the SS-TWR, and
a ranging final message for the DS-TWR; and
receiving, from one or more of the set of receive apparatuses, the ranging response message in the scheduling mode or the contention-based mode in the RRP.

18. The method of claim 15, further comprising:
identifying a ranging request measurement control information element (RRMC IE) for a DS-TWR or the SS-TWR;

transmitting, to the set of receive apparatuses, the ranging initiation message including the RRMC IE in a contention-based mode or a scheduling mode; and receiving, from one or more of the set of receive apparatuses, the ranging response message including information requested by the transmit apparatus in the contention-based mode or the scheduling mode.

19. The method of claim 15, further comprising at least one of:

transmitting, to the set of receive apparatuses and other transmit apparatuses, a ranging contention phase structure IE (RCPS IE) including information of a time structure for the RR; or receiving, from one or more of the set of receive apparatuses and the other transmit apparatuses, the RCPS IE including the information of the time structure for the RR, the RCPS IE comprising a contention period (CP) table length indicating a CP table and a length of CP table.

20. The method of claim 19, wherein a row element of the CP table includes:

a period indication field in two bits, to contend, indicating:

a polling period for the set of transmit apparatuses, the RRP for the set of receive apparatuses, or
a data period (DP) for both the transmit apparatus and the set of receive apparatuses;

a time-slot index to start field; and
a time-slot index to end field.

* * * * *